(12) United States Patent
Speed et al.

(10) Patent No.: US 10,847,790 B2
(45) Date of Patent: Nov. 24, 2020

(54) FUNCTIONALISED ELECTROCHEMICALLY ACTIVE MATERIAL AND METHOD OF FUNCTIONALISATION

(71) Applicant: NEXEON LIMITED, Abingdon (GB)

(72) Inventors: Jonathon David Speed, Reading (GB); Scott Brown, Cambridge (GB); Simon Foxon, Abingdon (GB); Tsuyonobu Hatazawa, Kanagawa (JP)

(73) Assignee: Nexeon Limited, Abingdon (GB)

( * ) Notice: Subject to any disclaimer, the term of this patent is extended or adjusted under 35 U.S.C. 154(b) by 149 days.

(21) Appl. No.: 15/777,099

(22) PCT Filed: Nov. 17, 2016

(86) PCT No.: PCT/GB2016/053595
§ 371 (c)(1),
(2) Date: May 17, 2018

(87) PCT Pub. No.: WO2017/085497
PCT Pub. Date: May 26, 2017

(65) Prior Publication Data
US 2018/0331353 A1   Nov. 15, 2018

(30) Foreign Application Priority Data

Nov. 17, 2015 (GB) .................................. 1520274.0
Nov. 17, 2015 (GB) .................................. 1520275.7

(51) Int. Cl.
*H01M 4/36* (2006.01)
*H01M 4/134* (2010.01)
(Continued)

(52) U.S. Cl.
CPC ........... *H01M 4/366* (2013.01); *H01M 4/134* (2013.01); *H01M 4/38* (2013.01); *H01M 4/386* (2013.01);
(Continued)

(58) Field of Classification Search
CPC ........ H01M 4/366; H01M 4/587; H01M 4/62; H01M 4/38; H01M 10/0525; H01M 4/60;
(Continued)

(56) References Cited

U.S. PATENT DOCUMENTS 6,395,367 B1   5/2002   Michot
9,252,421 B1   2/2016   Erickson et al.
(Continued)

FOREIGN PATENT DOCUMENTS

CN   1681145 A   10/2005
GB   2532501      5/2016
(Continued)

OTHER PUBLICATIONS

Muller et al. "Grafted and Crosslinked carbon black as an electrode material for double layer capacitors" Carbon (40) 2002, 307-314 (Year: 2002).*

(Continued)

*Primary Examiner* — Lisa S Park
(74) *Attorney, Agent, or Firm* — McDonnell Boehnen Hulbert & Berghoff LLP

(57) ABSTRACT

An electrochemically active material comprising a surface is provided, wherein at least part of the surface is functionalised with a grafted heteroatom-functionalised oligomer. A method of functionalising the surface with the oligomer is also provided.

25 Claims, 13 Drawing Sheets

(51) Int. Cl.
H01M 4/38 (2006.01)
H01M 4/60 (2006.01)
H01M 10/0525 (2010.01)
H01M 4/62 (2006.01)
H01M 4/587 (2010.01)
H01M 10/052 (2010.01)
H01M 10/054 (2010.01)
H01M 4/02 (2006.01)

(52) U.S. Cl.
CPC ............. *H01M 4/587* (2013.01); *H01M 4/60* (2013.01); *H01M 4/62* (2013.01); *H01M 10/0525* (2013.01); *H01M 4/362* (2013.01); *H01M 10/052* (2013.01); *H01M 10/054* (2013.01); *H01M 2004/021* (2013.01); *H01M 2004/027* (2013.01)

(58) Field of Classification Search
CPC .... H01M 4/134; H01M 4/386; H01M 10/054; H01M 4/362; H01M 10/052; H01M 2004/027; H01M 2004/021
See application file for complete search history.

(56) References Cited

U.S. PATENT DOCUMENTS

| | | | |
|---|---|---|---|
| 2002/0102380 A1 | 8/2002 | Armand | |
| 2006/0063178 A1 | 3/2006 | Rauh-Adelmann et al. | |
| 2006/0099512 A1 | 5/2006 | Nakai et al. | |
| 2007/0128516 A1 | 6/2007 | Im | |
| 2013/0209893 A1 | 8/2013 | Archer | |
| 2014/0011094 A1 | 1/2014 | Park | |
| 2014/0272572 A1 | 9/2014 | Chu et al. | |
| 2014/0346618 A1 | 11/2014 | Lahlouh | |
| 2016/0248121 A1* | 8/2016 | Uematsu ........... | H01M 10/0525 |

FOREIGN PATENT DOCUMENTS

| | | |
|---|---|---|
| JP | H11 126608 | 5/1999 |
| JP | 2011014298 A | 1/2011 |
| JP | 2012089399 A | 5/2012 |
| KR | 2014 0032835 | 3/2014 |
| KR | 2016 0019704 | 2/2016 |
| WO | WO 00/31101 | 6/2000 |
| WO | WO 2009/041399 | 4/2009 |
| WO | WO 2014/189923 | 11/2014 |

OTHER PUBLICATIONS

Richner et al., "Grafted and crosslinked carbon black as an elecrode material for double layer capacitors," Carbon, Elsevier, Oxford, GB, vol. 40, No. 3, Mar. 1, 2002, pp. 307-314.

Andersen et al., "A Nanoparticle Approach towards Morphology Controlled Organic Photovoltaics (OPV)", Polymers, vol. 4, No. 4, Jun. 11, 2012, pp. 1242-1258.

Uskokovic et al., "PEGylated silicon nanowire coated silica microparticles for drug delivery across intestinal epithelium," Biomaterials, Elsevier Science Publishers BV., Barking, GB, vol. 33, No. 5, Nov. 8, 2011, pp. 1663-1672.

Parak et al., "Conjugation of DNA to Silanized Colloidal Semiconductor Nanocrystalline Quantum Dots," Chemistgry of Materials, vol. 14, No. 5, May 1, 2002, pp. 2113-2119.

Davenas et al., "Silicon naowire/poly(3-hexylthiophene) hybrids for thin film solar cells," Journal of Non-Crystalline Solids., vol. 358, No. 17, Sep. 1, 2012, pp. 2534-2536.

Sudeep et al., "PEGylated silicon nanoparticles: synthesis and characterization," Chemical Communications—Chemcom., No. 46, Jan. 1, 2008, p. 6126.

Maurice et al., "Polymer-Grafted Silicon Nanoparticles Obtained Either via Peptide Bonding or Click Chemistry," Macromolecular Chemistry and Physics., vol. 213, No. 23, Dec. 13, 2012, pp. 2498-2503.

Copending U.S. Appl. No. 15/777,104, filed May 17, 2018.

* cited by examiner

FUNCTIONALISED ELECTROCHEMICALLY ACTIVE MATERIAL AND METHOD OF FUNCTIONALISATION

CROSS-REFERENCE TO RELATED APPLICATIONS

This application is a U.S. national phase application of International Patent Application no. PCT/GB2016/053595, filed Nov. 17, 2016, which claims the benefit of priority of Great Britain Patent Application no. 1520274.0, filed Nov. 17, 2015 and Great Britain Patent Application no. 1520275.7, filed Nov. 17, 2015.

FIELD OF THE INVENTION

The invention relates to an electrochemically active material, a negative electrode comprising the electrochemically active material, an electrochemical cell comprising the negative electrode, an electrical device comprising the electrochemical cell and a method of modifying at least part of an electrochemically active surface of an electrochemically active material.

BACKGROUND

Conventional electrochemical cells require as one of their components a negative electrode (in this specification referred to as an "anode") and an electrolyte. For example, in a lithium ion rechargeable battery, lithium ions are transported through the electrolyte to the anode. The anode may typically have a surface that comprises silicon, germanium, carbon (e.g. graphite) or a mixture thereof. On contact with the electrolyte, a solid-electrolyte interphase (SEI) layer is formed. The SEI layer is a compound formed from a reaction between the supporting electrolyte molecules and the silicon-, germanium- or carbon-comprising surface. This is usually considered to be a desirable feature, since it allows metal ions such as lithium ions to intercalate with the carbon anode surface or alloy with the silicon or germanium anode surface, whilst preventing further reaction between the electrolyte and the anode.

Unfortunately, the SEI layer contributes to a reduction in efficiency of the electrochemical cell in the first cycle, known as first cycle loss. The formation of the SEI layer on the anode causes loss of electrolyte, electrochemically active surface and metal ions. This reduces the efficiency of the first cycle of the electrochemical cell. This applies to electrochemically active surfaces comprising silicon, germanium, carbon or mixtures thereof.

For a surface comprising carbon, for example graphite, the first cycle loss has the greatest effect on the cell capacity of the electrochemical cell. There is a slight reduction of efficiency in subsequent cycles because, despite the SEI layer, supporting electrolyte molecules are still able to filtrate in between the graphene layers of the carbon anode surface, which blocks some of the available routes for lithium ions to intercalate, i.e. lithium ions are less able to filtrate between the graphene layers. Additionally, the carbon surface may suffer from "exfoliation": the peeling off of graphene layers due to the degradation caused by reaction with supporting electrolyte molecules. The SEI layer to some extent prevents this.

For an electrochemically active surface comprising silicon and/or germanium, the first cycle loss and subsequent cycle losses both have a large effect on the cell capacity of the electrochemical cell. Silicon, germanium and graphite anode materials are prone to expand and contract during charging and discharging of the cell, i.e. during lithiation and delithiation for a lithium ion electrochemical cell. The amount of expansion and contraction is sufficiently high, especially in the case of silicon and germanium, to cause the (substantially inelastic) SEI layer to crack and flake off or crack and accumulate at the anode surface. This exposes more of the anode surface, so that the newly exposed surface will react with the electrolyte to form more SEI layer. This phenomenon wastes material and reduces the efficiency of the cell: silicon or germanium and electrolyte are wasted in creating SEI layers to replace SEI layers that flake away from the anode surface; lithium is wasted as it is trapped in the SEI layer. Further, the size of the anode may increase due to the thickening SEI layer which decreases the distance between the anode and cathode which can cause damage to the cell. Further the SEI layer is electrically insulating which is undesirable at the anode. Further the excess formation of SEI can block pores within the anode layer and prevent electrolyte access to some regions of the anode. As a result the cell capacity decreases with every cell cycle.

Commonly, electrolytes are provided with additives. The additives may be targeted to address the deficiencies of the SEI layer noted above. For example, vinylene carbonate and fluoroethylene carbonate are commonly included to improve the strength and flexibility of the SEI layer. Nevertheless, the additives in an electrolyte are unable to prevent the formation of an SEI layer because they cannot prevent contact and therefore reaction between the electrolyte and the anode. Additionally, it is desirable to reduce the use of electrolyte additives because they may decompose within the cell and their effectiveness will be dependent on the first formation cycle regime used by the cell manufacturer. For example, a rest period at a known voltage may promote a specific variant of SEI formation, whilst a constantly sweeping voltage may promote a different variant.

Another way in which the problems of SEI layers have been addressed is by coating the anode surface. Coatings such as pyrolised carbon are typically used. These coatings offer some limited protection from electrolyte decomposition at the anode/electrolyte interface, however the applications of such coatings are limited. In particular, such coatings are permeable to supporting electrolyte molecules, so a SEI may still be able to form. Additionally, coatings tend to be continuous and thus are susceptible to cracking and peeling off during charging and discharging cell cycles, in which the anode expands and contracts as metal ions are incorporated and released.

It is therefore desirable to provide an electrochemically active material suitable for use at an anode surface in an electrochemical cell that reduces or prevents loss of capacity during each cell cycle.

Additionally, it is desirable to provide an electrochemically active material suitable for use at an anode surface in an electrochemical cell which does not result in wastage of materials through undesirable reactions between the anode and the electrolyte.

Further, it is desirable to provide an electrochemically active material suitable for use at an anode surface in an electrochemical cell that reduces or eliminates the need for additives in the electrolyte, and thus enabling the use of generic electrolytes. The present invention solves these problems.

SUMMARY OF THE INVENTION

One aspect of the invention provides an electrochemically active material comprising an electrochemically active surface, wherein at least part of the surface is functionalised with a grafted heteroatom-functionalised oligomer,
wherein the heteroatom-functionalised oligomer comprises a first end group, a second end group and a linker group therebetween,
wherein the first end group is directly bonded to the electrochemically active surface,
wherein the linker group has a carbon to heteroatom ratio of from 2:1 to 10:1, and wherein the heteroatoms comprise oxygen, nitrogen, sulphur, phosphorus, selenium or mixtures thereof.

Another aspect of the invention provides a particle comprising the electrochemically active material of the first aspect of the invention.

Another aspect of the invention provides a powder comprising the particles of the second aspect of the invention.

Another aspect of the invention provides a thin film comprising the electrochemically active material of the first aspect of the invention.

Another aspect of the invention provides a composite electrode layer comprising a particle of the second aspect of the invention, or a powder of the third aspect of the invention and at least one other component selected from (a) a binder, (b) a conductive additive and (c) particles of a further electrochemically active material.

Another aspect of the invention provides a negative electrode comprising (i) a current collector and (ii) a composite electrode layer according to the fifth aspect of the invention or a thin film according to the fourth aspect of the invention.

Another aspect of the invention provides a metal-ion battery comprising:
a) the negative electrode of the sixth aspect of the invention;
b) a positive electrode; and
c) an electrolyte between the negative electrode and the positive electrode.

Another aspect of the invention provides an electrical device comprising a metal-ion battery in accordance with the seventh aspect of the invention.

Another aspect of the invention provides a method of modifying at least part of an electrochemically active surface of an electrochemically active material, comprising grafting a heteroatom-functionalised oligomer to the at least part of the electrochemically active surface,
wherein the heteroatom-functionalised oligomer comprises a first end group, a second end group and a linker group therebetween,
wherein the first end group is grafted from the electrochemically active surface,
wherein the linker group has a carbon to heteroatom ratio of from 2:1 to 10:1, and wherein the heteroatoms comprise oxygen, nitrogen, sulphur, phosphorus, selenium or mixtures thereof.

Another aspect of the invention provides an electrochemically active material comprising a surface, wherein a linear or branched oligomeric moiety is covalently bonded to the surface, said oligomeric moiety being selected from the group consisting of: Formula I, Formula II, Formula III, and mixtures thereof, wherein the surface is bonded to the oligomeric moiety via group A, wherein A is silicon, carbon or germanium;

 Formula I:

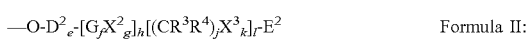 Formula II:

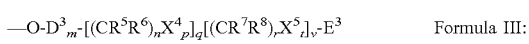 Formula III:

in which
G is an aryl group selected from:

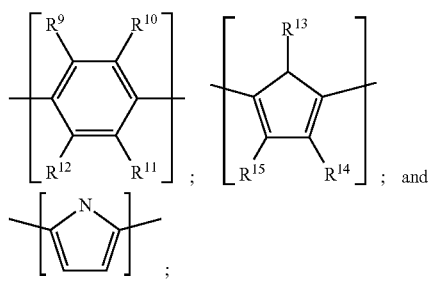

$R^1$, $R^2$, $R^3$, $R^4$, $R^7$ and $R^8$ are each independently selected from: H, F, fluorinated or non-fluorinated $C_{1-4}$ alkyl, fluorinated or non-fluorinated $C_{1-4}$ hydroxyalkyl, phenyl;
$R^5$ and $R^6$ are each independently selected from Formula IV;

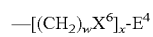 Formula IV:

$R^9$, $R^{10}$, $R^{11}$, $R^{12}$, $R^{13}$, $R^{14}$ and $R^{15}$ are each independently selected from: H, F, $CH_3$;
$X^1$, $X^2$, $X^3$, $X^4$, $X^5$ and $X^6$ are each independently selected from: O, PH, Se and NH;
$D^1$, $D^2$ and $D^3$ are each independently a first end group;
$E^1$, $E^2$, $E^3$ and $E^4$ are each independently a second end group;
a=0 or 1;
b=from 2 to 6;
c=0 or 1;
d=from 0 to 16;
e=0 or 1;
f=from 2 to 6;
g=0 or 1;
h=from 1 to 16;
j=from 2 to 6;
k=0 or 1;
l=from 0 to 15;
h+l=from 2 to 16;
m=0 or 1;
n=from 2 to 6;
p=0 or 1;
q=from 1 to 16;
r=from 2 to 6
t=0 or 1
v=0 to 15
q+v=from 2 to 16
w=2 to 6
x=from 1 to 15.

Another aspect of the invention provides an electrochemically active material comprising an electrochemically active surface, wherein at least part of the surface is functionalised with a grafted heteroatom-functionalised oligomer,
wherein the heteroatom-functionalised oligomer comprises a first end group, a second end group and a linker group therebetween,
wherein the first end group is directly bonded to the electrochemically active surface,
wherein the first end group is selected from a bond, an alkanediyl, an alkenediyl, an alkynediyl, a diyl of a secondary or a tertiary alcohol, an oxy-alkanediyl, a carboxylate group (OCO or COO), a carbonyl group, an alkenediyloxycarbonyl group, an alkenoyloxy group, an imino group, silyl group, a siloxane group, a hydroxyl modified phenylene, a carboxylic acid modified phenylene, an ether group (—O—), an amine group, (—NR— where R is H or $C_{1-4}$ alkyl), and mixtures thereof, wherein the linker group includes a repeating unit derived from linear or non-linear polyethers, linear or non-linear polycarbonates, polythiol ethers, polyamines, polyphosphines, polyesters, polyimines, polyureas, polythioureas, polyamides or mixtures thereof;

wherein the linker group has a carbon to heteroatom ratio of from 2:1 to 10:1, and wherein the heteroatoms comprise oxygen, nitrogen, sulphur, phosphorus, selenium or mixtures thereof;

wherein the second end group comprises a functional group selected from the group consisting of hydroxyl, a carboxylic acid, amino, sulphonyl, alkanoyl, alkanoyloxy, $NH_2CONH$—, linear and branched alkyl groups of the formula —$(CH_2)_aCH_3$, wherein $0 \leq a \leq 9$; linear and branched aryl and aralkyl groups of the formula —$(CH_2)_bC_6H_cF_d$, wherein $0 \leq b \leq 6$, and the sum of c and d is 5; linear and branched fluorinated alkyl groups of the formula —$(CH_2)_e(CF_2)_fCF_3$, wherein $0 \leq e \leq 6$ and $0 \leq f \leq 9$; hydrogen; optionally substituted benzoyl; and combinations thereof, with the proviso that when the linker group is derived from a polyamine the first end group is not a siloxane group.

Another aspect of the invention provides a method of modifying a surface of an electrochemically active material, the method comprising:
a. providing an electrochemically active material that comprises a surface,
b. providing an oligomeric moiety selected from the group consisting of Formula V, Formula VI, Formula VII and mixtures thereof,
c. activating the surface,
d. applying the oligomeric moiety of step (b) to the activated surface resulting from step (c),
wherein

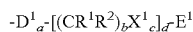  Formula V:

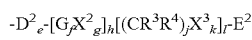  Formula VI:

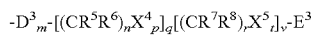  Formula VII:

in which $D^1$, $D^2$, $D^3$, $X^1$, $X^2$, $X^3$, $X^4$, $X^5$, $X^6$, $E^1$, $E^2$, $E^3$, $E^4$, G, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and a-x are as defined in claim 31.

The product and method of the invention are able to reduce or even prevent the loss of electrolyte, the loss of active material from the anode and the loss of metal ions such as lithium ions that would otherwise occur through the formation of SEI. Additionally, cell capacity does not decrease as much with each cell cycle when compared to conventional anodes that use electrochemically active materials at their surface without the modification of the invention.

The invention offers the further advantage that electrolytes with fewer or even no additives may be used. Clearly, the possibility of a generic electrolyte suitable for use with many electrode types is desirable for efficiency.

The invention is applicable to various types of electrochemical cells, including those utilising metal ions such as alkali metal ions or magnesium ions or calcium ions. Particular reference is made to lithium ion electrochemical cells (commonly referred to as lithium ion batteries) which have wide application in various electronic devices, although the invention is equally applicable to electrochemical cells that utilise sodium ions, potassium ions, magnesium ions, calcium ions and other suitable metal ions. Indeed, the availability of different types of electrochemical cells highlights the potential advantages of being able to use a generic electrolyte for multiple cell types.

DETAILED DESCRIPTION

Electrochemically Active Material

Figure 1A:
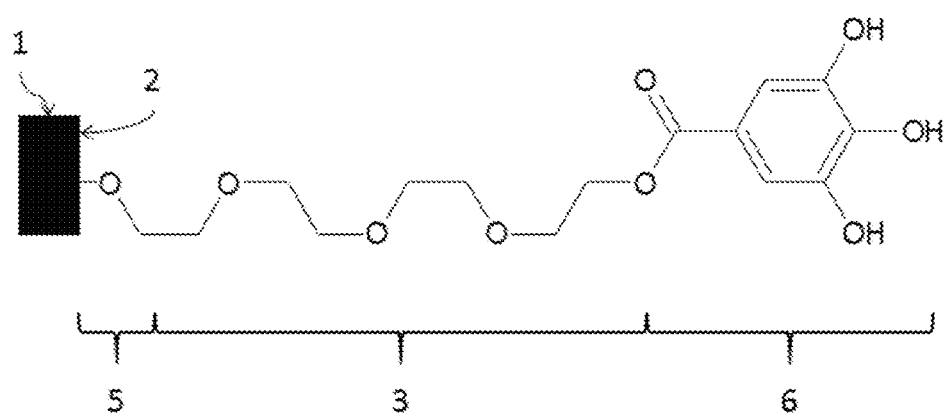
FIG. 1A shows a specific example of heteroatom-functionalised oligomer, grafted to an electrochemically active surface.

The electrochemically active material may be present in the form of a particle, a powder, a composite electrode layer or a thin film. The electrochemically active material may be at a surface of a negative electrode (hereinafter referred to as an "anode") in an electrochemical cell. The electrochemically active material may comprise silicon, carbon, germanium or mixtures thereof, preferably silicon, carbon or mixtures thereof, such as a silicon-carbon composite or silicon.

Preferably carbon is present in the form of natural or synthetic graphite, soft or hard carbon, preferably natural or synthetic graphite.

Silicon, carbon and germanium may be used due to their excellent ability to transfer electrical charge in an electrochemical cell. In particular, these materials are able to interact effectively with lithium ions in a lithium ion battery to efficiently transfer electrical charge.

In the form of particles, the electrochemically active material has a higher surface area than a planar electrochemically active material, which may increase the efficiency of charge transfer in an electrochemical cell. Particulate material is also easier to handle and process and allows much greater flexibility in the design of high capacity electrodes. In the form of particles, the electrochemically active material may have a D50 diameter no less than 10 nm, preferably no less than 20 nm. In the form of particles, the electrochemically active material may have a D50 diameter of no more than 40 μm, preferably no more than 30 μm, more preferably no more than 25 μm. Preferably, the particles may have a D50 diameter from 0.05 to 30 μm. Alternatively, the particles may have a D50 diameter from 50 nm to 250 nm.

The particles of the invention may be formed into composite particles formed from a plurality of smaller primary particles. The particles making up a composite particle can include non-active material particles such as conductive elements (e.g. carbon-based elements) or components binding the composite particle together. The D50 of composite particles may be 0.5 to 25 µm.

If the particles are too small, they become more difficult to handle and process and to achieve a uniform dispersion within an electrode. Furthermore any native oxides formed on the electrochemically active surfaces will be a higher weight % of the total mass of active material, lowering overall capacity. If the particles are too large it may be difficult to make a strong dense composite electrode layer with a uniform thickness.

Electrochemically active particles may be in the form of spheroidal elements. Electrochemically active particles may be in the form of elongate elements, for example in the form of nanowires, fibres, tubes, flakes or ribbons. When in the form of such elongate elements the minor and major dimensions of the elongate elements should preferably also be within the minimum and maximum D50 diameters defined herein. For example elongate elements preferably have a minimum dimension of at least 10 nm, more preferably at least 20 nm. Preferably elongate elements have a maximum dimension of no more than 40 µm, more preferably no more than 30 µm.

Electrochemically active particles may be formed from a plurality of connected and/or branched elongate elements and/or spheroidal elements as described herein, arranged in a random or ordered manner to form a particulate structure containing the electrochemically active elongate and/or spheroidal elements.

Electrochemically active particles may be porous. "Porous" may be defined as comprising pores or voids, either at the surface and/or in the bulk of the particle. These are intra-particle pores or voids. The pore/void spaces may have average dimensions that are at least 10 nm. The pore/void spaces may have dimensions that are preferably no more than one tenth of the particle's D50 diameter. Porosity may be viewed under optical microscopy or scanning electron microscopy. In the case of porous active particles, the particles may have a porosity of at least 10%, preferably at least 20%, more preferably at least 25%. The porous particles may have a porosity less than 90%, preferably less than 85%.

Particle porosity may be calculated using mercury porosimetry as described in ASTM UOP578-11 (Automated Pore Volume and Pore Size Distribution of Porous Substances by Mercury Porosimetry, ASTM International, West Conshohocken, Pa., 2011, www.astm.org). That method gives the porosity of a powder sample as a sum of inter-particle porosity (the spaces between particles in the powder) and intra-particle porosity (the pores within particles). The intra-particle porosity is the % porosity of the electrochemically active material of the invention and can be calculated from the total porosity.

Porosity of a composite electrode layer according to the invention may also be calculated. This porosity can be measured by image analysis of SEM images of cross-sections of the electrode. Image analysis software (e.g. open source ImageJ software) can distinguish pores within an SEM image. At least three cross-sections of the electrode should be taken and the % porosity quoted as an average of the value calculated for each cross-section.

The oligomer of the invention may bond to the surface inside a pore as well as on the outer surface of a porous particle.

The electrochemically active particles may be arranged on, formed on or attached to one or more substrates. The substrate(s) may be planar substrates or particulate substrates.

The invention may have a particular benefit when the electrochemically active material is in the form of porous particles, because pores tend to become blocked during the formation and distortion of a conventional SEI layer. With the invention, this can be avoided and thus the pores may be more available for wetting by the electrolyte and for access by the metal ions.

One type of particulate material suitable for use as the electrochemically active material is graphene sheets or nanographene platelets. Nanographene platelets are particles comprising of the order of 10 up to 100 aligned graphene layers. For example between 2 and 200 graphene layers, such as between 2 and 30 graphene layers.

For the avoidance of doubt, the term "particle diameter" as used herein refers to the equivalent spherical diameter (esd), i.e. the diameter of a sphere having the same volume as a given particle, wherein the particle volume is understood to include the volume of the intra-particle pores. The terms "D50" and "D50 particle diameter" as used herein refer to the volume-based median particle diameter, i.e. the diameter below which 50% by volume of the particle population is found.

Particle diameters and particle size distributions as reported herein can be determined by routine laser diffraction techniques. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer 2000 particle size analyzer from Malvern Instruments. The Malvern Mastersizer 2000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The electrochemically active material may be in the form of a powder. A powder is a plurality of discrete particles. A powder is flowable, that is, it is possible to pour a powder from one container to another. A powder may comprise particles, and/or composite particles.

A composite electrode layer comprises particles or a powder of the invention and at least one other component selected from (a) a binder, (b) a conductive additive and (c) particles of a further electrochemically active material. The composite electrode layer suitably has a thickness in the range of from 2 µm to 2 mm, preferably 5 µm to 1 mm, preferably 10 µm to 500 µm, preferably 10 µm to 200 µm, preferably 10 µm to 100 µm, preferably 10 µm to 50 µm.

The composite electrode layer is suitably a porous layer, preferably with a porosity that is at least 10% by volume, more preferably at least 20% by volume.

Thin film form may be preferred for applications where a very small electrode area is desired, or for niche applications such as flexible batteries or high temperature or high rate operation. In the form of a thin film, the electrochemically active material may have a thickness of no less than 1 nm, preferably no less than 3 nm. In the form of a thin film, the electrochemically active material may have a thickness of no more than 10 µm, preferably no more than 5 µm, preferably no more than 1 µm.

An electrochemically active material may be defined as one that undergoes a change in composition when subjected to an applied potential. In the case of electrochemical cells and batteries, an electrochemically active material may undergo an intercalation process of metal ions (for example intercalation of lithium ions into graphite) or an alloying process (for example the formation of silicon-lithium alloys) or a conversion into a metal-ion-containing compound, during the charging of the cell for electrochemically active materials present in the negative electrode.

Oligomer

The grafted oligomer comprises a heteroatom-functionalised oligomer. A heteroatom-functionalised oligomer may be dielectric, i.e. able to hold charge without conducting it. Heteroatom-functionalised oligomers may be advantageous due to their ability to solvate metal ions, such as lithium ions. In this manner, the grafted heteroatom-functionalised oligomer acts as a replacement for a SEI layer.

However, unlike a SEI layer, the grafted heteroatom-functionalised oligomer does not suffer from the negative effects of expansion and contraction during the charging and discharging phases of a cell cycle in the same manner as a SEI found on conventional anodes and therefore may not be prone to the cracking that SEI suffers. There are several reasons for this. One is that a SEI layer and a grafted heteroatom-functionalised oligomer are different material types with different physical properties. Another reason is that a SEI layer is largely continuous, whereas the grafted heteroatom-functionalised oligomer is discrete and is grafted substantially perpendicularly to the electrochemically active material surface.

A further advantage over a SEI layer is that the grafted heteroatom-functionalised oligomer is not formed as a product of a reaction between the anode and the electrolyte and thus no material—electrolyte molecules, electrochemically active material and metal ions—is wasted during charging and discharging.

In this invention, the heteroatom-functionalised oligomer comprises a first end group, a second end group and a linker group therebetween, wherein the first end group is directly bonded to the electrochemically active surface, wherein the linker group has a carbon to heteroatom ratio of from 2:1 to 10:1, and wherein the heteroatoms comprise oxygen, nitrogen, sulphur, phosphorus, selenium or mixtures thereof.

The linker group is covalently bonded to the first end group and the second end group.

The linker group may have a carbon to heteroatom ratio of from 2:1 to 5:1.

The heteroatoms of linker group are preferably oxygen, nitrogen, phosphorus, selenium or mixture thereof, more preferably oxygen, phosphorus, selenium or mixtures thereof, most preferably oxygen.

A grafted heteroatom-functionalised oligomer is one that has been attached to an existing molecule or bulk material. In this case, the heteroatom-functionalised oligomer is attached to the electrochemically active material surface by covalent bonding. Preferably, each heteroatom-functionalised oligomer has only one covalent bond to the surface.

The electrochemically active material preferably comprises an array of the heteroatom-functionalised oligomers are covalently bonded to the surface.

Where an array of heteroatom-functionalised oligomers is provided, from 5 to 100% of the area of the surface is covered by heteroatom-functionalised oligomers. Surface area may be measured by gas adsorption techniques such as Brunauer-Emmet-Teller. % coverage can be inferred by the relationship of $\%_{wt}$ C in the product and surface area.

When an array of heteroatom-functionalised oligomers are covalently bonded to the surface, they may together act in a manner analogous to ion channels found in biology. The heteroatom-functionalised oligomers extend radially outward from the surface, forming these channels. The channels allow metal ions, for example lithium ions or sodium ions in a cell, to reach the surface, whilst excluding supporting electrolyte molecules, for example alkyl carbonates.

The ion channels created by an array of heteroatom-functionalised oligomers attached to the surface may also play a key role in preventing the formation of a conventional SEI layer. Since the heteroatom-functionalised oligomers may typically extend radially outward from the surface, this array is not subject to cracking in the same manner as conventional coatings are during intercalation of metal ions into the electrochemically active material in the context of a secondary battery, for example by lithiation. This may be because the heteroatom-functionalised oligomers attach to the surface only via the first end group and because the heteroatom-functionalised oligomers do not cross link with each other.

The heteroatom-functionalised oligomer may be grafted to the electrochemically active material surface in one step. This is possible where the linker group and any end groups are pre-assembled into a single molecule.

Alternatively, a first end group may be attached to the electrochemically active material surface by covalent bonding and the linker group and second end groups may be grafted from the first end group.

Preferred linker groups include linear polyethers, non-linear polyethers, polycarbonates, polythiol ethers, polyamines, polyphosphines, carbonyl-containing oligomers, polyimines, polyureas, polythioureas, polyamides, dendrimers, silicones, alucones, polyphosphates, polyorganophosphates, multicomponent Ugi synthesis oligomers and mixtures thereof. These linker groups may be advantageous for their ability to solvate lithium ions.

The linker group preferably includes a repeating unit derived from linear or non-linear polyethers, linear or non-linear polycarbonates, polythiol ethers, polyamines, polyphosphines, polyesters, polyimines, polyureas, polythioureas, polyamides or mixtures thereof.

When the linker group is derived from a polyamine, the first end group is not a siloxane group.

Particularly preferred linker groups are linear polyethers, non-linear polyethers and polycarbonates. Most preferably, the linker group is polyethylene glycol.

Linear polyethers, for example polyethylene glycol, may be particularly efficient at solvating lithium ions in a manner similar to ion channels in biological cells that use crown ethers to solvate sodium and potassium ions. It is well known that crown ethers can solvate and complex alkali metals (the original synthesis of metal-crown ether complexes can be found in JACS, 1967, 89 (26), p 7017-7036).

An array of linear polyethers can be considered analogous to an ion channel arranged perpendicularly to the surface of the active material.

Branched and hyperbranched linker groups such as polyethers may result in a higher density layer at the electrolyte end of the heteroatom-functionalised oligomer compared to the end of the heteroatom-functionalised oligomer nearest to the surface of the electrochemically active material. This may be advantageous in order to minimise the amount of electrolyte that is able to reach the surface of the electrochemically active material, whilst maximising the electrical conductivity of the surface of the electrochemically active material by leaving as much of the surface exposed to incoming metal ions and not grafted to the heteroatom-functionalised oligomer as possible.

A branched oligomer sporadically branches off a new chain. Hyperbranched oligomers may be considered to be a special subset of branched oligomers, in that branching is not sporadic, rather it occurs at every monomer unit.

Polycarbonates may mimic the ability of commonly used carbonate electrolytes to solvate metal ions, for example lithium ion, solvation ability of. In a carbonate electrolyte, a metal ion may be chelated by carbonate molecules, typically by four carbonate molecules. Using polycarbonate in the invention may aid solvation of metal ions by providing a favourable environment similar to that of the electrolyte, thus reducing the energy barrier for the metal ions to reach the surface of the electrochemically active material.

The grafted heteroatom-functionalised oligomer, excluding any end groups, that is, the linker group, may have a length of at least 0.8 nm. A smaller length may be insufficient to separate metal ions from supporting electrolyte molecules in an electrochemical cell with the consequence that supporting electrolyte molecules may be able to reach the surface of the electrochemically active material and thereby have a chance of forming a SEI layer.

The grafted heteroatom-functionalised oligomer, excluding any end groups, that is the linker group, may have a length of no more than 3.5 nm, preferably no more than 3 nm, most preferably no more than 2 nm. A greater length may present too high an energy barrier in an electrochemical cell for metal ions to diffuse through and reach the surface of the electrochemically active material.

Alternatively, the grafted heteroatom-functionalised oligomer, excluding any end groups, that is, the linker group, may be characterised in terms of the number of monomer units that it comprises. Preferably, the grafted heteroatom-functionalised oligomer, excluding any end groups, that is, the linker group, may consist of from 2 to 15 monomer units, such as 2 to 10 monomer units, preferably 2 to 6 monomer units.

The linker group may be a homogeneous polymer. Alternative the linker group may be in the form of a random copolymer, or a block copolymer.

The first end group may comprise an oxide functionalised group or a silicon or germanium hydride functionalised group. Suitable groups may be selected from moieties derived from an alkane, an alkene or alkyne, a primary, secondary or tertiary alcohol, an ether, a carboxylate, an ester, a hydroxy-modified benzene, a carboxylic acid modified benzene, a primary amine, a secondary amine, and mixtures thereof. In one embodiment, the first end group is a bond, that is, the linker group is directly bonded to the electrochemically active surface.

Preferably, the first end group may comprise at least one of an ether, a carbonate, an ester, an alkane and an alkene. When the grafted heteroatom-functionalised oligomer is branched, carbonate and ether may be beneficial as the first end group to aid branch formation. A carbonate first end group may mimic the lithium solvation ability of commonly used carbonate electrolytes. An alkyl first end group may be beneficial for use with a silicon active material surface due to the reaction that may be used to covalently bond it to the electrochemically active material surface. One possible reaction is able to remove $SiO_2$ during the reaction process. $SiO_2$ forms on the surface of silicon, but is an undesirable electrically insulating layer that reacts with and traps lithium ions thereby forming $Si(OLi)_4$.

Preferably the first end group is selected from a bond, an alkanediyl, an alkenediyl, an alkynediyl, a diyl of a secondary or a tertiary alcohol, an oxyalkylene, a carboxylate group, an alkenyloxycarbonyl group, an alkenoyloxy group, an imino group, a silyl group, a siloxane group, a hydroxyl modified phenylene, a carboxylic acid modified phenylene, or mixtures thereof.

A first end group derived from an ether may link to the surface as follows: [Si]—O—R A first end group derived from a carboxylate may be linked to the surface either as [Si]—O—C(O)—O—R or as [Si]—O—C(O)—R or as [Si]—C(O)—O—

A first end group derived from an ester may link to the surface as [Si]—$(CH_2)_m$—O—C(O)—O A first end group derived from an amine may be bonded to the surface of the electrochemically active material via either nitrogen or carbon.

The first end group may preferably be covalently bonded to the surface in any of the following arrangements, in which [Si] represents a silicon atom that is part of the surface of the electrochemically active material.

[Si]—O—Si—C—

[Si]—C=CH— i.e. a first end group derived from an alkene (an alkene diyl)

[Si]—$CH_2$—$CH_2$— i.e. a first end group derived from an alkane (an alkane diyl)

[Si]—C≡C— i.e. a first end group derived from an alkyne (an alkyne diyl).

The first end group may have a length of at least 0.1 nm. A smaller length may represent a molecule, or even only an atom or a covalent bond, with no useful functional groups.

The first end group may have a length of no more than 0.6 nm. A greater length may present too high an energy barrier in an electrochemical cell for lithium ions to diffuse through and reach the surface of the electrochemically active material. Additionally, a greater length may result in an excess of bulky functional groups adjacent to the surface of the electrochemically active material, which may reduce the electrochemical functionality of the surface.

The grafted heteroatom-functionalised oligomer comprises a second end group. In the context of an electrochemical cell, the second end group forms an interface between the heteroatom-functionalised oligomer and the electrolyte and has a function analogous to a semi-permeable membrane: metal ions, for example lithium ions, may pass through to the heteroatom-functionalised oligomer, but supporting electrolyte molecules may not.

The second end group may have a length of at least 0.1 nm. A smaller length may represent a molecule, or even only an atom or a covalent bond, with no useful functional groups.

The second end group may have a length of no more than 1 nm. A greater length may present too high an energy barrier in an electrochemical cell for lithium ions to diffuse through and reach the linker group and ultimately reach the surface of the electrochemically active material.

The second end group may comprise an alcohol, a carboxylic acid, an amine, a sulphonate, a carbonate, a urea, linear or branched alkyl groups of the formula —$(CH_2)_a CH_3$, wherein $0 \leq a \leq 9$; linear or branched aryl and aralkyl groups of the formula —$(CH_2)_b C_6 H_c F_d$, wherein $0 \leq b \leq 6$, and the sum of c and d is 5; linear or branched fluorinated alkyl groups of the formula —$(CH_2)_e (CF_2)_f CF_3$, wherein $0 \leq e \leq 6$ and $0 \leq f \leq 9$; optionally substituted benzoyl groups; hydrogen; and combinations thereof.

The alcohol may be of the formula —$(CH_2)_g CR^1 R^2 OH$, wherein $0 \leq g \leq 9$, and $R^1$ and $R^2$ are each independently H or —$(CH_2)_h CH_3$ and wherein $0 \leq h \leq 9$.

The carboxylic acid may be of the formula —$(CH_2)_j COOH$, wherein $0 \leq j \leq 9$.

The sulphonate may be of the formula —$(CH_2)_k SO_3 H$, wherein $0 \leq k \leq 9$.

The amine may be of the formula —$(CH_2)_m N R^3 R^4$ and wherein $0 \leq m \leq 9$, and $R^3$ and $R^4$ are each independently H or —$(CH_2)_n CH_3$ and wherein $0 \leq n \leq 9$.

The carbonate may be of the formula —$(CH_2)_p OCOOR^5$ wherein $0 \leq p \leq 9$, and $R^5$ is —$(CH_2)_q CH_3$ and wherein $0 \leq q \leq 9$.

The urea maybe of the formula —$(CH_2)_r NR^6 CONR^7 R^8$, wherein $0 \leq r \leq 9$, and $R^6$, $R^7$ and $R^8$ are each independently H or —$(CH_2)_t CH_3$ and wherein $0 \leq t \leq 9$.

A substituted benzoyl group may be a hydroxy substituted (such as 5-hydroxy) iso-phthaloyl group.

These end groups may be chosen on the basis of their ability to filter out supporting electrolyte molecules whilst allowing through metal ions, for example lithium ions. In one embodiment, the second end group may be a hydrogen atom.

The second end group may deter supporting electrolyte molecules from reaching the surface of the electrochemically active material by one or both of steric hindrance and electrostatic repulsion.

Preferably the second end group comprises one or more of a primary alcohol, a secondary alcohol and a tertiary alcohol. These end groups may provide steric hindrance to deter supporting electrolyte molecules. Where the second end group provides steric hindrance, the end group may be polar without attracting supporting electrolyte molecules towards the surface of the electrochemically active material. This may help to attract lithium ions towards the surface of the electrochemically active material.

In some embodiments, the oligomer may be a linear or branched oligomeric moiety is covalently bonded to the surface, said oligomeric moiety being selected from the group consisting of: Formula I, Formula II, Formula III, and mixtures thereof, wherein the surface is bonded to the oligomeric moiety via group A, wherein A is silicon, carbon or germanium;

  Formula I:

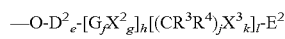  Formula II:

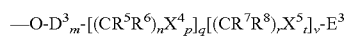  Formula III:

in which
G is an aryl group selected from:

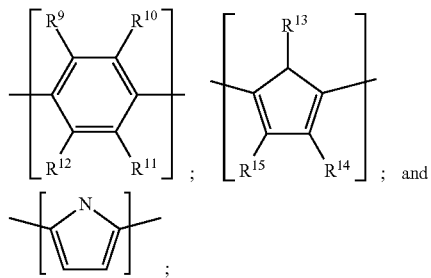

$R^1$, $R^2$, $R^3$, $R^4$, $R^7$ and $R^8$ are each independently selected from: H, F, fluorinated or non-fluorinated $C_{1-4}$ alkyl, fluorinated or non-fluorinated $C_{1-4}$ hydroxyalkyl, phenyl;

$R^5$ and $R^6$ are each independently selected from Formula IV;

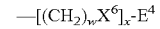  Formula IV:

$R^9$, $R^{10}$, $R^{11}$, $R^{12}$, $R^{13}$, $R^{14}$ and $R^{15}$ are each independently selected from: H, F, and $CH_3$;

$X^1$, $X^2$, $X^3$, $X^4$, $X^5$ and $X^6$ are each independently selected from: O, PH, Se and NH, preferably O, PH and Se, more preferably O;

$D^1$, $D^2$ and $D^3$ are each independently a first end group, preferably $D^1$, $D^2$ and $D^3$ are independently selected from the group consisting of: fluorinated or non-fluorinated $C_{1-4}$ alkyl, fluorinated or non-fluorinated $C_{1-4}$ ester, fluorinated or non-fluorinated $C_1$-4 ether, a silane, a siloxane, and mixtures thereof, preferably fluorinated or non-fluorinated $C_{1-4}$ alkyl, fluorinated or non-fluorinated $C_1$-4 ether and mixtures thereof;

$E^1$, $E^2$, $E^3$ and $E^4$ are each independently a second end group, preferably $E^1$, $E^2$, $E^3$ and $E^4$ is each independently selected from the group consisting of:

linear or branched alkyl groups of the formula —$(CH_2)_y CH_3$, wherein $0 \leq y \leq 9$;

linear or branched phenyl groups of the formula —$(CH_2)_{aa} C_6 H_{ab} F_{ac}$, wherein $0 \leq aa \leq 6$, and the sum of ab and ac is 5;

linear or branched fluorinated alkyl groups of the formula —$(CH_2)_{ad} (CF_2)_{ae} CF_3$, wherein $0 \leq ad \leq 6$ and $0 \leq ae \leq 9$;

hydroxyl;

hydrogen; and combinations thereof;

a=0 or 1;

b=from 2 to 6, preferably from 2 to 4, more preferably 2 or 3;

c=0 or 1;

d=from 0 to 16, preferably from 2 to 12, more preferably from 2 to 10, more preferably from 2 to 6;

e=0 or 1;

f=from 2 to 6, preferably from 2 to 4, more preferably 2 or 3;

g=0 or 1;

h=from 1 to 16;

j=from 2 to 6, preferably from 2 to 4, more preferably 2 or 3;

k=0 or 1;

l=from 0 to 15;

h+l=from 2 to 16, preferably from 2 to 12, more preferably from 2 to 10, more preferably from 2 to 6;

m=0 or 1;

n=from 2 to 6, preferably from 2 to 4, more preferably 2 or 3;

p=0 or 1;
q=from 1 to 16;
r=from 2 to 6, preferably from 2 to 4, more preferably 2 or 3
t=0 or 1
v=0 to 15
q+v=from 2 to 16, preferably from 2 to 12, more preferably from 2 to 10, more preferably from 2 to 6.
w=2 to 6, preferably 2 or 3
x=from 1 to 15, preferably from 2 to 6.

Grafting

The invention relates to a method of modifying at least part of a surface of an electrochemically active material, comprising grafting a heteroatom-functionalised oligomer to or from at least part of the surface. The at least part of the surface of the electrochemically active material to be functionalised may be first treated with the first end group and the linker group may subsequently be grafted from the first end group. The second end group may be grafted to the linker group prior to grafting the heteroatom-functionalised oligomer to the first end group. Alternatively, the second end group may be separately grafted from the linker group.

Where the at least part of the surface of the electrochemically active material to be functionalised is first treated with the first end group, a covalent bond between the surface of the electrochemically active material and the first end group may be achieved by any of the following reactions: carboxylic acid based silyl ester formation, acid chloride based silyl ester formation, alkyl halide silyl ether formation, epoxide ring opening ether formation, carbonate ring opening reaction, imidazolidone ring opening reaction, silicon hydride modification (removing the native silicon oxide with an HF wash to allow a subsequent reaction with the first end group), alkene based silicon hydride decomposition, alkyne based silicon hydride decomposition, Grignard based silicon hydride decomposition, $PCl_5$ surface modification (the surface may be functionalised with a Si—Cl moiety, replacing the Si—H moiety, which provides $Cl^-$ as a potential leaving group for a subsequent Grignard reaction), UV initiated alkene reaction, UV initiated alkyne reaction, and combinations thereof. Preferably, the reaction is selected from an epoxide ring opening ether formation, a carbonate ring opening reaction and an alkene based silicon hydride decomposition.

A silicon hydride decomposition reaction may also remove any $SiO_2$ from a silicon surface. $SiO_2$ is an unfavourable insulating layer that reacts with a traps lithium ions as $Si(OLi)_4$ is formed.

In other embodiments, the native oxide layer is utilised in the grafting process. A silicon surface, in the absence of any oxide stripping treatment, comprises a silanol terminated silicon oxide layer, comprising silanol (Si—OH) groups, siloxanes (Si—O—Si) and $SiO_2$. A silanol group may react to form a silyl ether (Si—O—R) or a silyl ester (SiOOR)). A germanium surface behaves in a similar manner to a silicon surface.

A carbon surface may comprise alcohol (COH) or acid (COOH) groups. Both groups may react to form an ether (C—O—R) or an ester (COOR).

Prior to attaching the oligomer to the surface, the surface may be activated. Surface activation leads to the surface having a smooth and uniform layer and to control the ratio of different oxide groups, for example isolated, vicinal and geminal silanol groups for a silicon surface; alcohol, acid, ether and ester groups for a carbon surface. Suitable methods for surface activation include heating under an inert or oxidising atmosphere or applying an oxidising solution to the surface, for example nitric acid, piranha solution or hydrogen peroxide solution.

The activated surface possesses an oxide layer that may react and bond to the first end group of the oligomer. Reaction may be by any suitable method, for example epoxy ring opening, chloride substitution, diethylene glycol dehydration or silanol-silane cross-coupling. The exact method used will depend on the nature of the first end group of the oligomer, but the result will always be bonding in the order [surface]-[oxygen atom]-[first end group].

In use in a secondary battery, a metal ion may attack the [oxygen atom]-[first end group] bond. For example, a lithium ion may attack the bond to form $Si(OLi)_4$, if the surface comprises silicon. Then the oligomer will detach from the surface. The new surface group of the formula —$(OT)_e$, where T is a group I or II metal and e=1, 2 or 3, e.g. $Si(OLi)_4$, is still beneficial compared to a conventional SEI layer because metal ions may still intercalate with the electrochemically active material and because the oligomer may remain close to the surface, thus still preventing passage of supporting electrolyte molecules, such as carbonates, to the surface.

Alternatively, prior to grafting, the heteroatom-functionalised oligomer may be provided with a first end group covalently bonded to the linker group to be grafted to the surface and a second end group covalently bonded to the distal end. The grafting step may then comprise the heteroatom-functionalised oligomer being grafted to the at least part of the surface of the electrochemically active material via the first end group, such that the first end group is covalently bonded to the at least part of the surface of the electrochemically active material.

Grafting may be conducted ex situ, such that the electrochemically active material and the linker group and end groups are grafted together prior to the assembly of a component or device comprising the functionalised electrochemically active material. This may allow a high degree of control over the amount of surface that is functionalised by grafting and may also allow the distribution of grafted heteroatom-functionalised oligomer to be controlled.

Alternatively, grafting may be conducted in situ, such that the electrochemically active material is present at the surface of an assembled electrode prior to grafting. In the case of a particulate electrochemically active material, this may allow a minimum amount of heteroatom-functionalised oligomer to be used, thus saving materials, since the surfaces that will not be exposed to electrolyte in a fully assembled device will not bond to the heteroatom-functionalised oligomer or first end group.

Preferably, the heteroatom-functionalised oligomer is grafted to at least 10% of the surface area of the electrochemically active material. Below this amount, supporting electrolyte molecules may not be prevented from reaching the anode in an electrochemical cell.

Preferably, the heteroatom-functionalised oligomer is grafted less than 100% of the surface area of the electrochemically active material, preferably less than 80% of the surface area of the electrochemically active material. It is necessary to have electrochemically active material available to allow the metal ions to interact with the metal ions and maintain the electrochemical activity of the anode surface.

The amount of coverage of the heteroatom-functionalised oligomer on the surface of the electrochemically active material may be controlled by, for example, the concentration of reagents, the reaction temperature and steric hindrance. Large functional groups or long chains provide steric hindrance during grafting, resulting in a lower density of coverage.

The electrochemically active surface may be porous. In this case, grafting to or from an internal pore surface may be achieved by conducting at least part of the reaction under vacuum.

In some embodiments, the method of modifying a surface of an electrochemically active material comprises the steps:
a. providing an electrochemically active material that comprises a surface,
b. providing an oligomeric moiety selected from the group consisting of Formula V, Formula VI, Formula VII and mixtures thereof,
c. activating the surface,
d. applying the oligomeric moiety of step (b) to the activated surface resulting from step (c),
wherein

   Formula V:

   Formula VI:

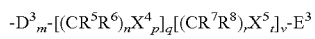   Formula VII:

in which $D^1$, $D^2$, $D^3$, $X^1$, $X^2$, $X^3$, $X^4$, $X^5$, $X^6$, $E^1$, $E^2$, $E^3$, $E^4$, G, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and a-x are as defined in claim 31.

The surface is optionally activated in step (c) with an oxidising solution.

Surface bound polyamines may be formed via Si—OH surface groups and silanisation. A diamine reacts with an epoxide (oxacyclopropane) to ring open, resulting in an alcohol amine.

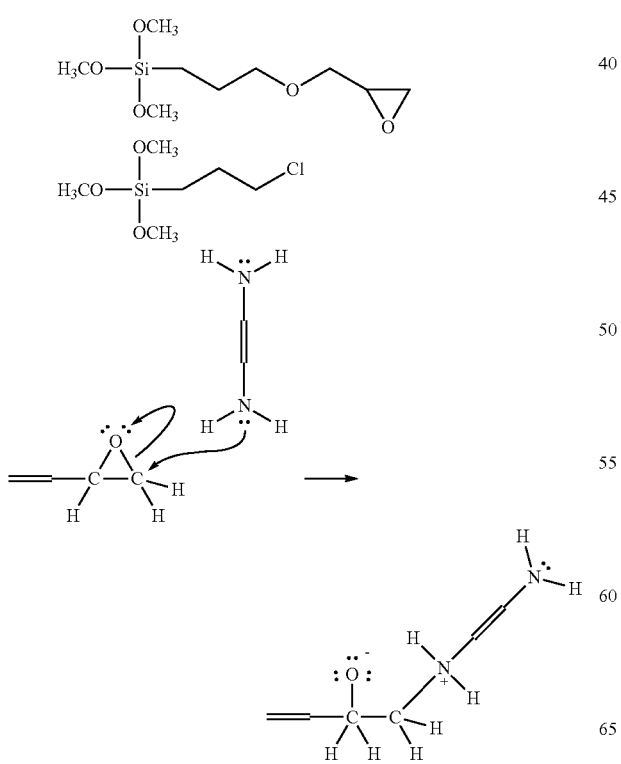

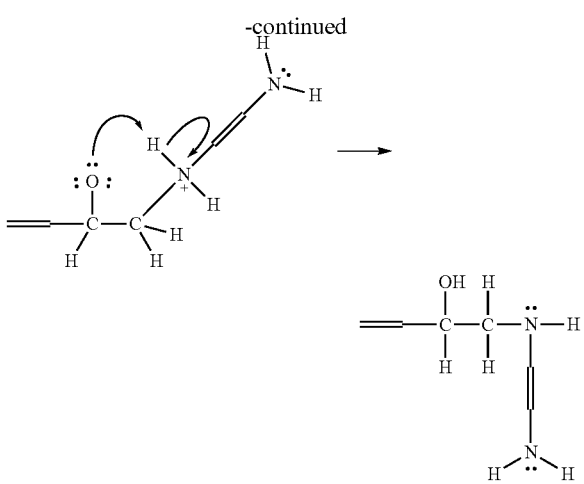

A surface bound polyimine may be formed by an epoxide reaction. Polyethylene imine will react with an epoxide ring. The dilution of PEI can be controlled to prevent agglomeration. The epoxide may initially be bound to the surface as shown below:

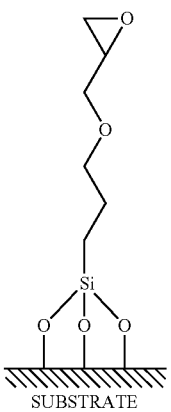

A polyurea based linker group may be formed by linking a triethoxy unit (e.g. as shown below) onto an Si—OH surface group using silanisation chemistry, for example refluxing for 18 hours in anhydrous toluene under argon. The pendant isocyanate group can then react with diamines and other diisocyanates to yield polyureas.

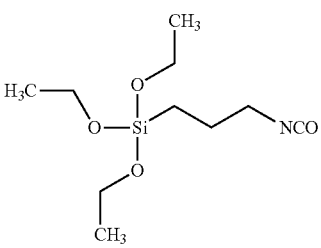

A polyamide based linker group may be formed via a Si—OH surface group and silanisation. The pendant amine surface can be reacted with a dicarboxylic acid, or corresponding anhydride, and a diamine.

Electrode

The electrochemically active material of the invention may be used in a negative electrode. The negative electrode comprises (i) a current collector; and (ii) a composite electrode layer or a thin film as defined above. In this application, the electrode efficiency may be improved compared to an electrode comprising a non-functionalised electrochemically active material. First cycle loss may be reduced. For Si and Ge electrochemically active surfaces, efficiency over later cycles may be improved.

The term current collector refers to any conductive substrate which is capable of carrying a current to and from the electrochemically active particles in the electrode composition. Examples of materials that can be used as the current collector include copper, aluminium, stainless steel, nickel, titanium sintered carbon and alloys or laminated foils comprising the aforementioned materials. Copper is a preferred material. The current collector is typically in the form of a foil or mesh having a thickness of between 3 to 500 µm. The electrochemically active particles of the invention may be applied to one or both surfaces of the current collector in the form of a composite electrode layer, alternatively, the thin film of the present invention may be applied one or both surfaces of the current collector.

Electrochemically active materials preferably constitute at least 50% by weight, more preferably at least 60% by weight of, more preferably at least 70 wt %, and optionally at least 80 wt %, for example at least 85 wt %, at least 90 wt %, or at least 95 wt % of the total weight of the composite electrode layer or thin film. The electrochemically active material may comprise the electrochemically active materials of the invention, and additional electrochemically active materials. The electrochemically active materials of the invention are preferably at least 1 wt % of the electrochemically active materials present in the composite electrode layer or thin film, more preferably at least 3 wt %, more preferable at least 5 wt %, more preferably at least 10 wt %, most preferably at least 20 wt % of the electrochemically active materials present in the composite electrode layer or thin film. The electrochemically active materials of the invention are preferably less than 90 wt % of the electrochemically active materials present in the composite electrode layer or thin film, more preferably less than 80 wt %, more preferably less than 50 wt % of the electrochemically active materials present in the composite electrode layer or thin film.

The composite electrode layer and thin film of the invention may optionally comprise a binder. A binder functions to adhere the composite electrode layer and thin film to a current collector and to maintain the integrity of the electrode composition. The binder is preferably a polymer-based binder. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR), and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total weight of the composite electrode layer or thin film.

The binder may optionally be present in combination with one or more additives that modify the properties of the binder, such as cross-linking accelerators, coupling agents and/or adhesive accelerators.

The composite electrode layer and thin film of the invention may optionally comprise one or more conductive additives. Preferred conductive additives are included so as to improve electrical conductivity between the electrochemically active components of the composite electrode layer or thin film and between the electrochemically active components of the composite electrode layer or thin film and a current collector. The conductive additives may suitably be selected from carbon black, carbon fibres, carbon nanotubes, acetylene black, ketjen black, denka black, graphene, nanographene platelets, reduced graphene oxide, metal fibres, metal powders and conductive metal oxides. Preferred conductive additives include carbon black, carbon fibres, graphene and carbon nanotubes.

The one or more conductive additives may suitably be present in a total amount of from at least 0.05 and no more than 20 wt %, preferably no more than 15 wt % and most preferably no more than 10 wt %, based on the total weight of the composite electrode layer or thin film.

The electrode of the invention may suitably be fabricated by combining particles or a powder of the electrochemically active of the invention with a solvent and optionally one or more viscosity modifying additives to form a slurry. The slurry is then cast onto the surface of a current collector and the solvent is removed, thereby forming a composite electrode layer on the surface of the current collector. Further steps, such as heat treatment to cure any binders and/or calendering/pressing of the composite electrode layer to densify it may be carried out as appropriate.

Alternatively, the slurry may be formed into a freestanding film or mat comprising the electrochemically active of the invention, for instance by casting the slurry onto a suitable casting template, removing the solvent and then removing the casting template. The resulting film or mat is in the form of a cohesive, freestanding mass which may then be bonded to a current collector by known processes.

A thin film of the present invention may be deposited on a current collector or bonded to a current collector by known processes.

Metal-Ion Batteries

The electrode of the invention may be used as the negative electrode (anode during discharge) of a metal-ion battery comprising an anode, the anode comprising an electrode as described previously, a cathode comprising a cathode active material capable of releasing and reabsorbing metal ions; and an electrolyte between the anode and the cathode.

Use in this context may decrease the first cycle loss and may improve cycle capacity retention over a greater number of cell cycles. The invention is of particular advantage in alkali metal ion or magnesium ion or calcium ion metal-ion batteries, that is, where the salt in the electrolyte is selected from a lithium salt, a sodium salt, a potassium salt, a magnesium salt, a calcium salt and mixtures thereof, preferably a lithium salt. Preferably, the invention is used in a lithium ion battery.

Additionally, including the functionalised electrochemically active material of the invention may help to maintain the thickness of the electrode close to its original thickness. The thickness of an electrode may increase in a conventional electrochemical cell as a result of irreversible expansion. This is particularly evident on silicon electrodes as the continued expansion and contraction of the particle during cycling causes SEI to crack and accumulate at the anode surface or flake away, exposing fresh silicon surface. This fresh surface forms more SEI which contributes to the overall thickness of the electrode, resulting in an irreversible expansion, namely electrode expansion that is not reversed during delithiation of the silicon. This thickness change is undesirable, but may be minimised by use of the functionalised electrochemically active material of the invention, which avoids the formation of an SEI layer and reduces irreversible expansion.

A further benefit of using the functionalised electrochemically active material of the invention in an electrochemical cell may be reduced resistance across the cell when compared to an equivalent non-functionalised electrochemically active material. This can be measured using electron impedance spectroscopy.

The metal ions are preferably selected from lithium, sodium, potassium, calcium or magnesium. More preferably the rechargeable metal-ion battery of the invention is a lithium-ion battery, and the cathode active material is capable of releasing and lithium ions.

The cathode active material is preferably a metal oxide-based composite.

Examples of suitable cathode active materials for a lithium-ion battery include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.1}Al_{0.05}O_2$, $LiNi_{0.4}Co_{0.3}Mn_{0.3}O_2$, $LiNi_{0.33}Co_{0.33}Mn_{0.34}O_2$ and lithium metal phosphate olivines such as $LiFePO_4$. The cathode current collector is generally of a thickness of between 3 to 500 μm. Examples of materials that can be used as the cathode current collector include aluminium, stainless steel, nickel, titanium and sintered carbon.

The electrochemically active material comprising a surface functionalised with a grafted heteroatom-functionalised polymer of the invention is compatible for use in an electrochemical cell with various electrolytic solutions.

The electrolyte is suitably a non-aqueous electrolyte containing a metal salt, e.g. a lithium salt for a lithium-ion battery, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Importantly, the electrochemically active material of the invention may mean that some electrolyte additives can be dispensed with. In particular, additives that modify the surface or modify the conventional SEI layer may no longer be necessary, because the oligomer may protect the surface.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, lithium iodide, $LiSiO_4$, $Li_2SiS_3$, $Li_4SiO_4$, $LiOH$ and $Li_3PO_4$.

The lithium salt for a lithium-ion battery is suitably soluble in the chosen solvent or mixture of solvents. Examples of suitable lithium salts include $LiCl$, $LiBr$, $LiI$, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$, $CF_3SO_3Li$, and lithium bis (oxalate)borate.

Where the electrolyte is a non-aqueous organic solution, the battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material may be present within both the composite anode layer and the composite cathode layer. The polymer electrolyte material can be a solid polymer electrolyte or a gel-type polymer electrolyte.

To compensate for the difficulties arising from SEI layers, electrolytes are commonly provided with additives. The invention may eliminate the need for some or all of these additives, with associated efficiency savings.

DETAILED DESCRIPTION OF DRAWINGS

FIG. 1A shows an electrochemically active material 1 with an electrochemically active surface 2 with a grafted oligomer 5, 3, 6. The first end group 5 of the oligomer is grafted substantially perpendicular to the electrochemically active surface 2. The second end group 6 of the heteroatom-functionalised oligomer is at the end distal from the electrochemically active surface 2. The linker group 3, is between the first end group 5 and the second end group 6. The heteroatom-functionalised oligomer shown is one example that may be used in the present invention.

Figure 1B:
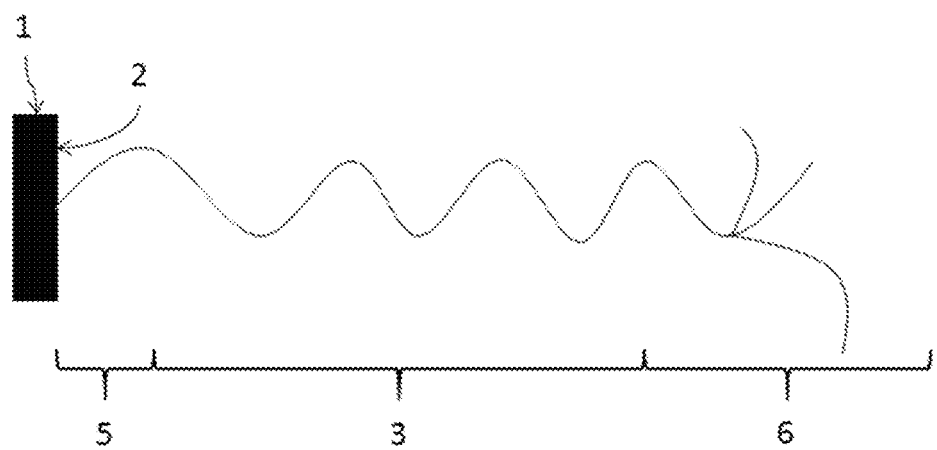
FIG. 1B shows a generalised schematic of FIG. 1A.

FIG. 1B shows a schematic of an electrochemically active material 1 with an electrochemically active surface 2 with a grafted heteroatom-functionalised oligomer 5, 3, 6. The first end group 5 of the heteroatom-functionalised oligomer is grafted substantially perpendicular to the electrochemically active surface 2. The second end group 6 of the heteroatom-functionalised oligomer is at the end distal from the electrochemically active surface 2. The linker group 3, is between the first end group 5 and the second end group 6.

Figure 2:
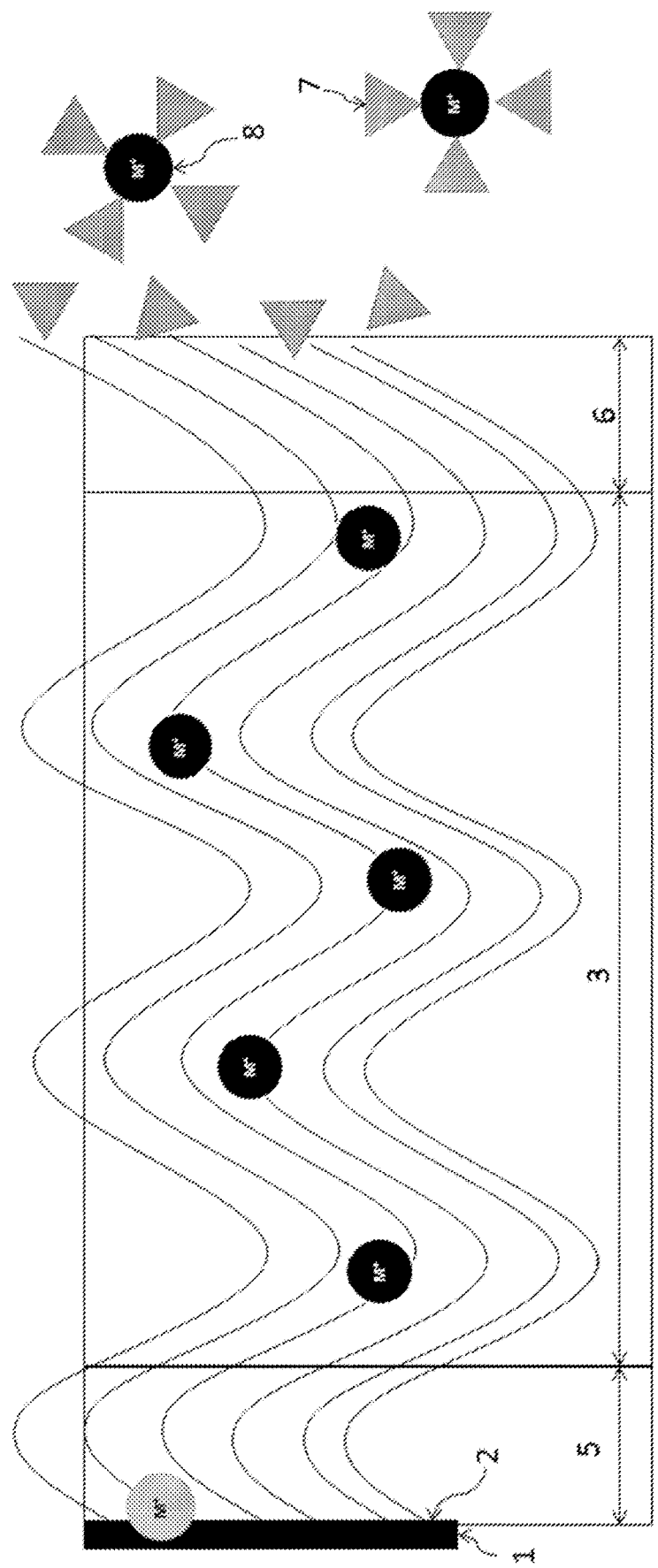
FIG. 2 shows a schematic of the functionalised surface of the invention in the context of an electrochemical cell.

FIG. 2 shows a schematic of electrochemically active material 1 with an electrochemically active surface 2 with a grafted heteroatom-functionalised oligomer shown in sections 5, 3, 6. Multiple chains of heteroatom-functionalised oligomer are shown. The first end group 5 of each of the heteroatom-functionalised oligomer chains is grafted substantially perpendicular to the electrochemically active surface 2. The second end group 6 of each of the heteroatom-functionalised oligomer chains is at the end distal from the electrochemically active surface 2. The linker group 3 of each of the heteroatom-functionalised oligomer chains, is between the first end group 5 and the second end group 6. Metal ions 8 are solvated by either the electrolyte groups 7 or the heteroatom-functionalised oligomer 5, 3, 6. The metal ions may be $M^+$ ions such as lithium, sodium or potassium ions, or $M^{2+}$ ions, such as magnesium or calcium ions. The metals ions 8 can move through the spaces between the heteroatom-functionalised oligomer chains and can reach the electrochemically active surface 2. The electrolyte groups 7 may not move through the spaces between the heteroatom-functionalised oligomer chains and may not reach the electrochemically active surface 2.

Figure 3A:
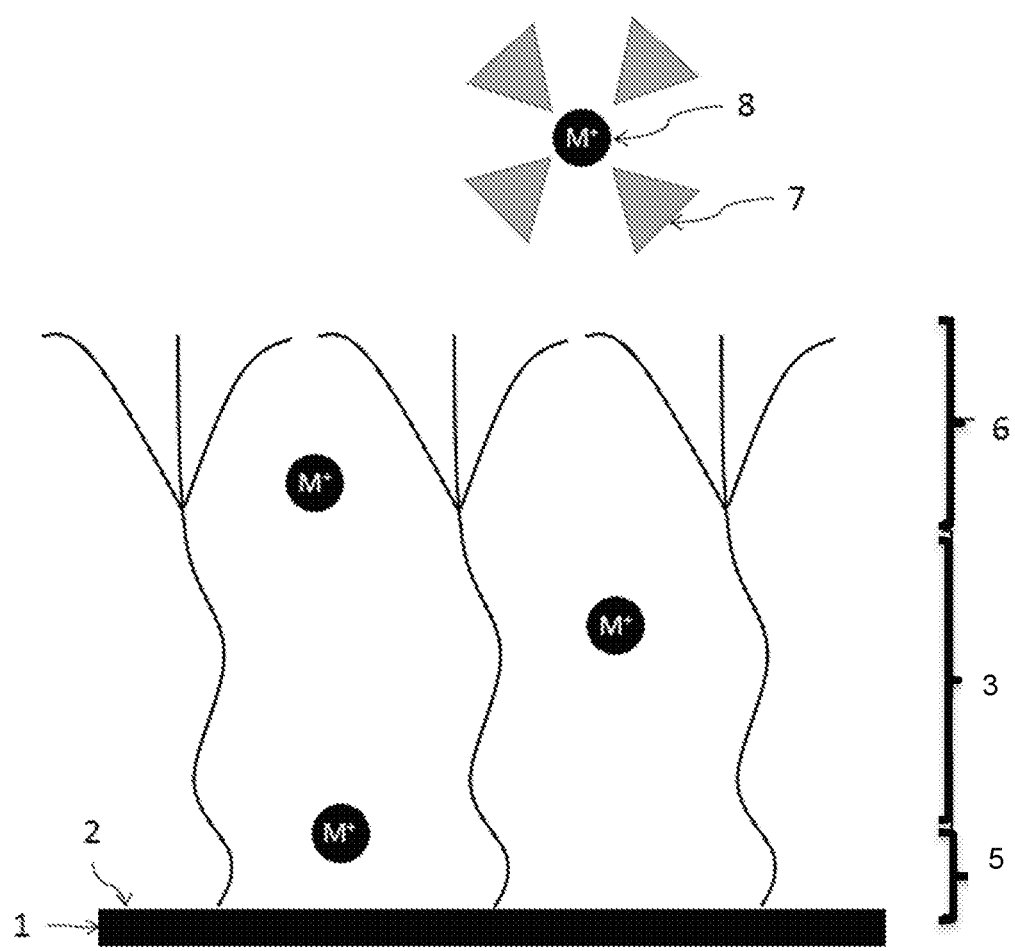
FIG. 3A shows a schematic of the functionalised surface of the invention with steric hindrance distal to the functionalised surface.

FIG. 3A shows a schematic of an electrochemically active material 1 with an electrochemically active surface 2 with a grafted heteroatom-functionalised oligomer shown in sections 5, 3, 6. Multiple chains of heteroatom-functionalised oligomer are shown. The first end group 5 of each of the heteroatom-functionalised oligomer chains is grafted substantially perpendicular to the electrochemically active surface 2. The second end group 6 of each of the heteroatom-functionalised oligomer chains is at the end distal from the electrochemically active surface 2. The linker group 3 of each of the heteroatom-functionalised oligomer chains, is between the first end group 5 and the second end group 6. The second end groups are bulky groups that sterically hinder the solvation of electrolyte groups. Metal ions 8 are solvated by either the supporting electrolyte molecules 7 or the heteroatom-functionalised oligomer 3, 6. The metal ions may be $M^+$ ions such as lithium, sodium or potassium ions, or $M^{2+}$ ions, such as magnesium or calcium ions. The metals ions 8 can pass though the spaces between the heteroatom-functionalised oligomer chains and can reach the electrochemically active surface 2. The supporting electrolyte molecules 7 may not pass though the spaces between the heteroatom-functionalised oligomer chains and cannot reach the electrochemically active surface 2.

Figure 3B:
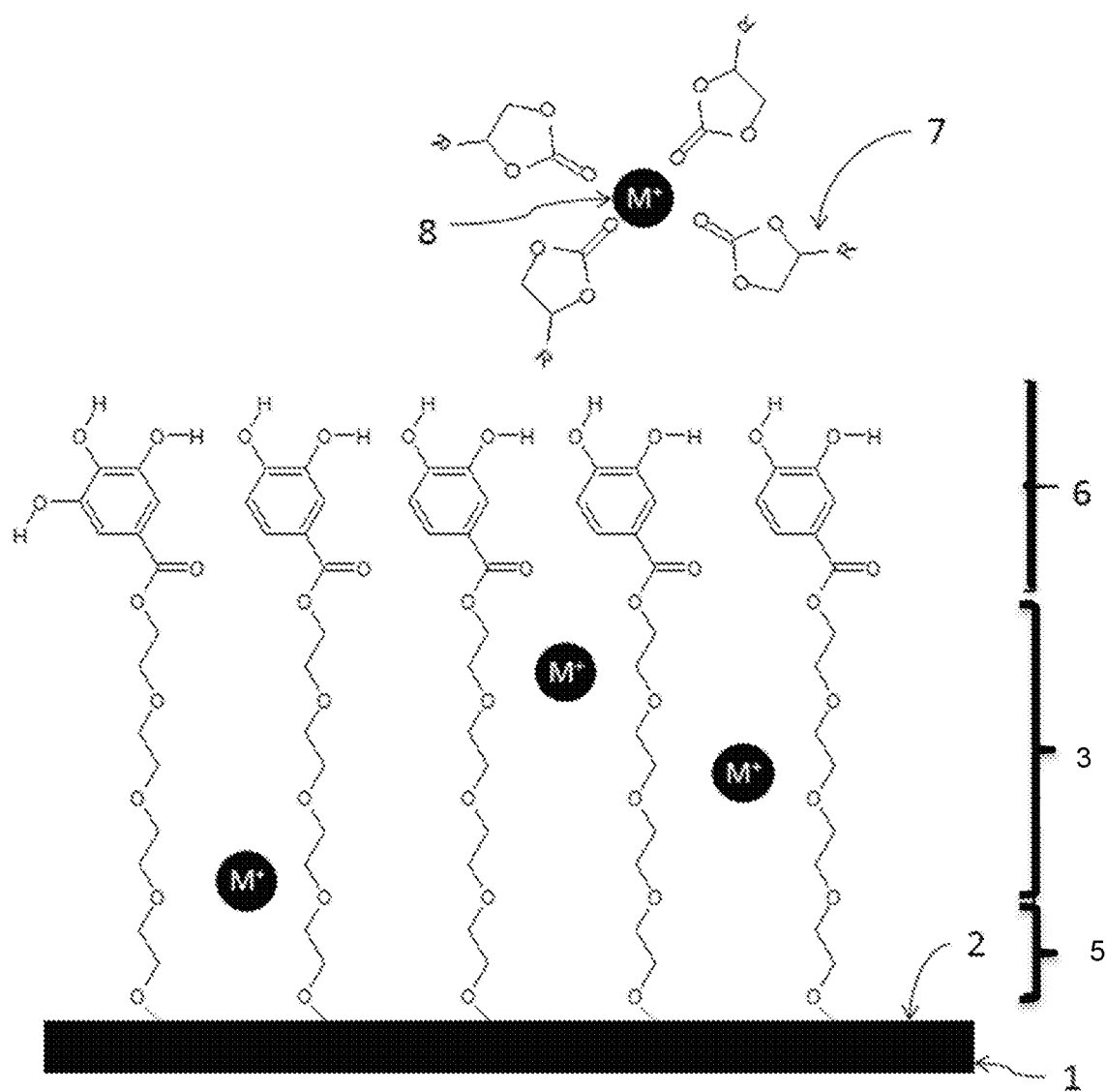
FIG. 3B shows a specific example of the schematic of FIG. 3A.

FIG. 3B shows an electrochemically active material 1 with an electrochemically active surface 2 with a grafted heteroatom-functionalised oligomer shown in sections 5, 3, 6. Multiple chains of heteroatom-functionalised oligomer are shown. The first end group 5 of each of the heteroatom-functionalised oligomer chains is grafted substantially perpendicular to the electrochemically active surface 2. The second end group 6 of each of the heteroatom-functionalised oligomer chains is at the end distal from the electrochemically active surface 2. The linker group 3 of each of the heteroatom-functionalised oligomer chains, is between the first end group 5 and the second end group 6. The second end groups are bulky groups that sterically hinder the solvation of electrolyte groups. Metal ions 8 are solvated by either the supporting electrolyte molecules 7 or the heteroatom-functionalised oligomer 3, 6. The metal ions may be $M^+$ ions such as lithium, sodium or potassium ions, or $M^{2+}$ ions, such as magnesium or calcium ions. The metals ions 8 can pass though the spaces between the heteroatom-functionalised oligomer chains and can reach the electrochemically active surface 2. The supporting electrolyte molecules 7 may not pass though the spaces between the heteroatom-functionalised oligomer chains and may not reach the electrochemically active surface 2. The heteroatom-functionalised oligomer and electrolyte groups shown are one example that may be used in the present invention.

Figure 4:
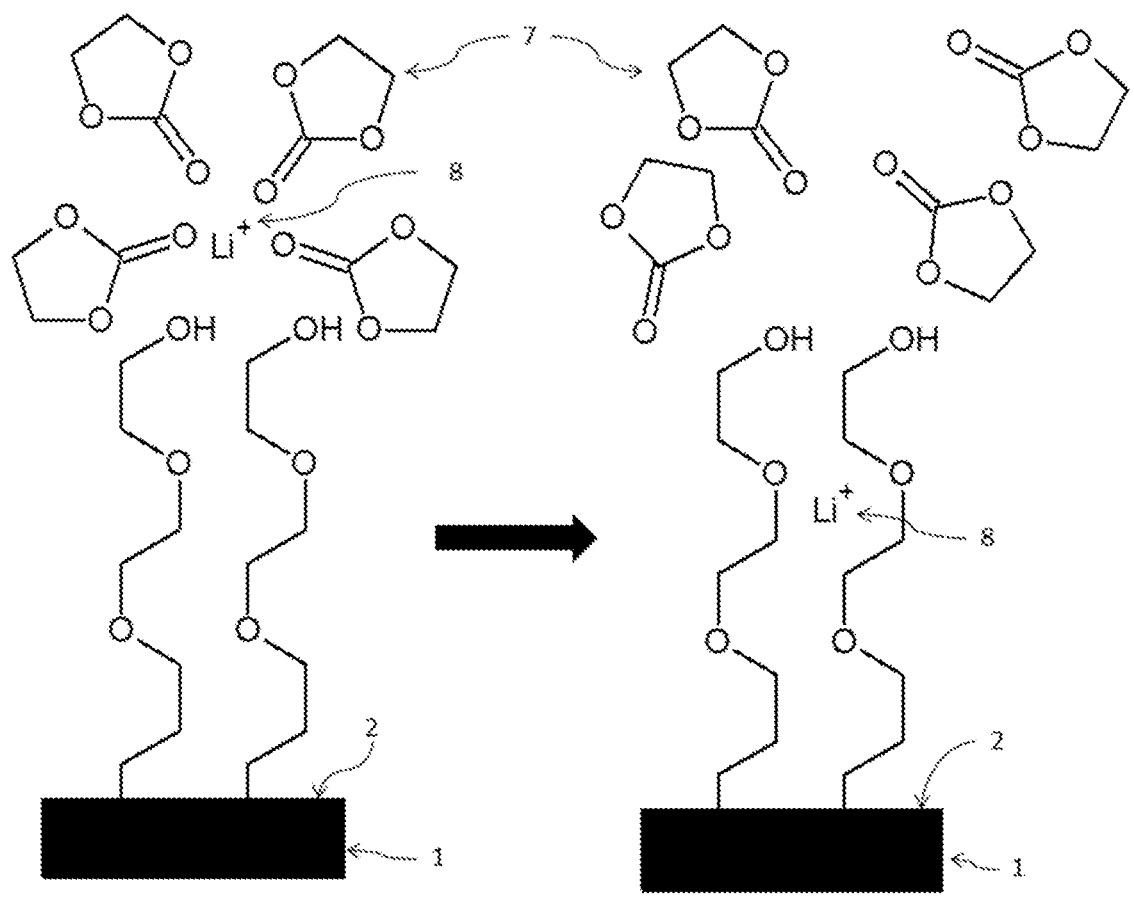
FIG. 4 shows a specific example of the transfer of a metal ion from chelation in an electrolyte to solvation in between heteroatom-functionalised oligomer chains.

FIG. 4 shows a lithium ion 8 firstly being solvated by supporting electrolyte molecules 7, and secondly being solvated by heteroatom-functionalised oligomer chains grafted to an electrochemically active surface 2 of an electrochemically active material. The heteroatom-functionalised oligomer and electrolyte shown are one example that may be used in the present invention. The lithium ion is one example of a metal ion that can be used in the present invention.

Figure 5:
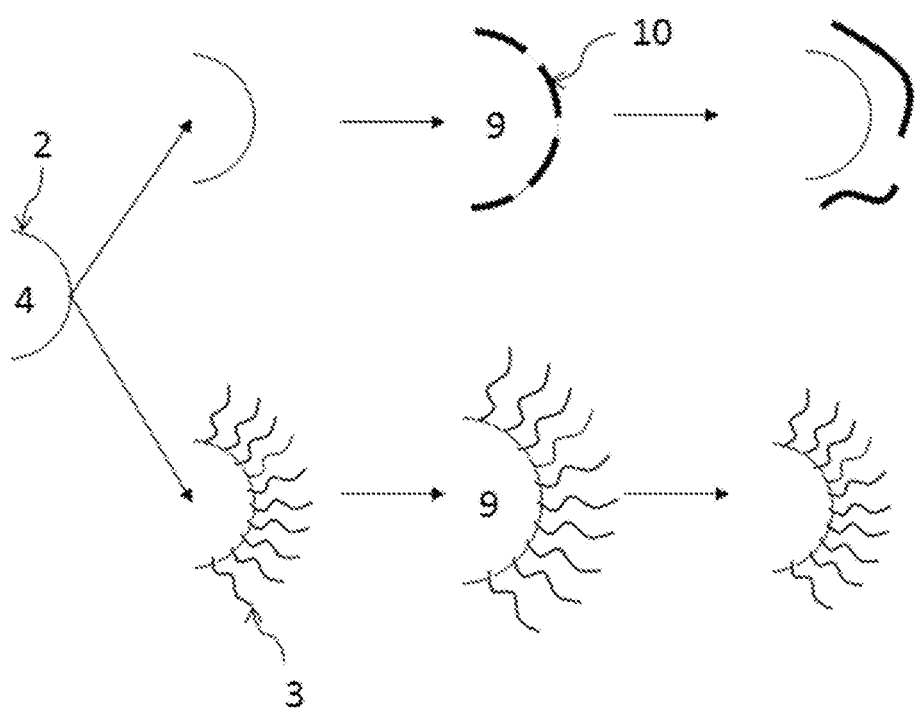
FIG. 5 shows a comparison of the effect of anode expansion when the anode has a conventional SEI layer (top) and when the anode is functionalised according to the invention (bottom).

FIG. 5 shows a schematic of a particulate electrochemically active material 4 with an electrochemically active surface 2. The top part of the schematic shows an expanded particulate electrochemically active material 9 with a secondary electrolyte interphase (SEI) layer 10. As shown the SEI layer 10 has cracked due to the expansion of the particulate electrochemically active material. When the particulate electrochemically active material 4 contracts, the SEI layer flakes off the material. Cracked SEI layer may also accumulate at the anode surface, causing thickening of the anode. Further SEI layer will then be formed on the newly exposed electrochemically active surface 2. In contrast, the bottom part of the schematic shows a particulate electrochemically active material 4 with an electrochemically active surface 2 with a grafted heteroatom-functionalised oligomer 3 attached substantially perpendicular to the electrochemically active surface 2. As particulate electrochemically active material expands 9 and then contracts, the grafted heteroatom-functionalised oligomer 3 remains grafted substantially perpendicular to the electrochemically active surface 2. This shows that the grafted heteroatom-functionalised oligomer is unaffected by the expansion of the electrochemically active surface 2.

EXAMPLES

Comparative Example 1

Porous silicon particles of were obtained by leaching 12 wt % Si—Al alloy particles. The porous silicon particles had a $D_{50}$ particle diameter of 20.6 µm and a porosity of 82%. The porous particles of Comparative Example 1 were used in test cells without any additional surface treatments.

Example 1

5 g porous particulate silicon with a surface area of approximately 100 $m^2$ $g^{-1}$ in accordance with Comparative Example 1 were washed in a mixture of 10 mL water and 30 mL $HNO_3$ for 30 min, before collecting by filtration and washing with water. The silicon particles were then suspended in 20 mL N-methylpyrrolidone and 2 mL glycidol, and stirred at 140° C. overnight before cooling, collecting by filtration and washing with water.

Surface area may be calculated as BET surface area. BET surface area refers to the surface area per unit mass calculated from a measurement of the physical adsorption of gas molecules on a solid surface, using the Brunauer-Emmett-Teller theory, in accordance with ASTM B922/10.

The resulting product has a hyperbranched oligomer coating with a silyl ether first end group, a non-linear polyether heteroatom-functionalised oligomer and an alcohol second end group. The branched structure of the heteroatom-functionalised oligomer offers a higher density close to the electrolyte, which may help to prevent access to the anode by the electrolyte, with a lower density close to the anode, allowing the electrochemically active material surface to retain a higher amount of electrochemical activity:

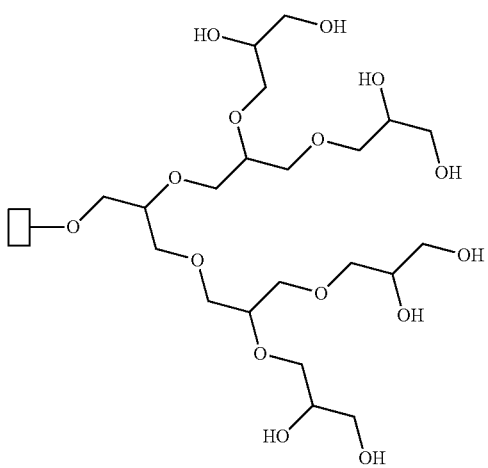 [SMILES: COCC(COCC(COCC(O)CO)OCC(O)CO)OCC(COCC(O)CO)OCC(O)CO]

Alternative Method for Example 1

6 g Si (NEX3-172-N078) is suspended in 40 mL THF and 1 mL glycidol is added. Reaction heated to reflux under an Ar atmosphere and stirred with heating and Ar over the weekend. Product collected by filtration, washed with 2×100 mL water and dried overnight at 70° C. The resulting structure is as above. The BET surface area was 49 m²/g. The particle size distribution was (μm) $D_{10}$=1.0; $D_{50}$=7.3; $D_{90}$=22.8.

Figure 11:
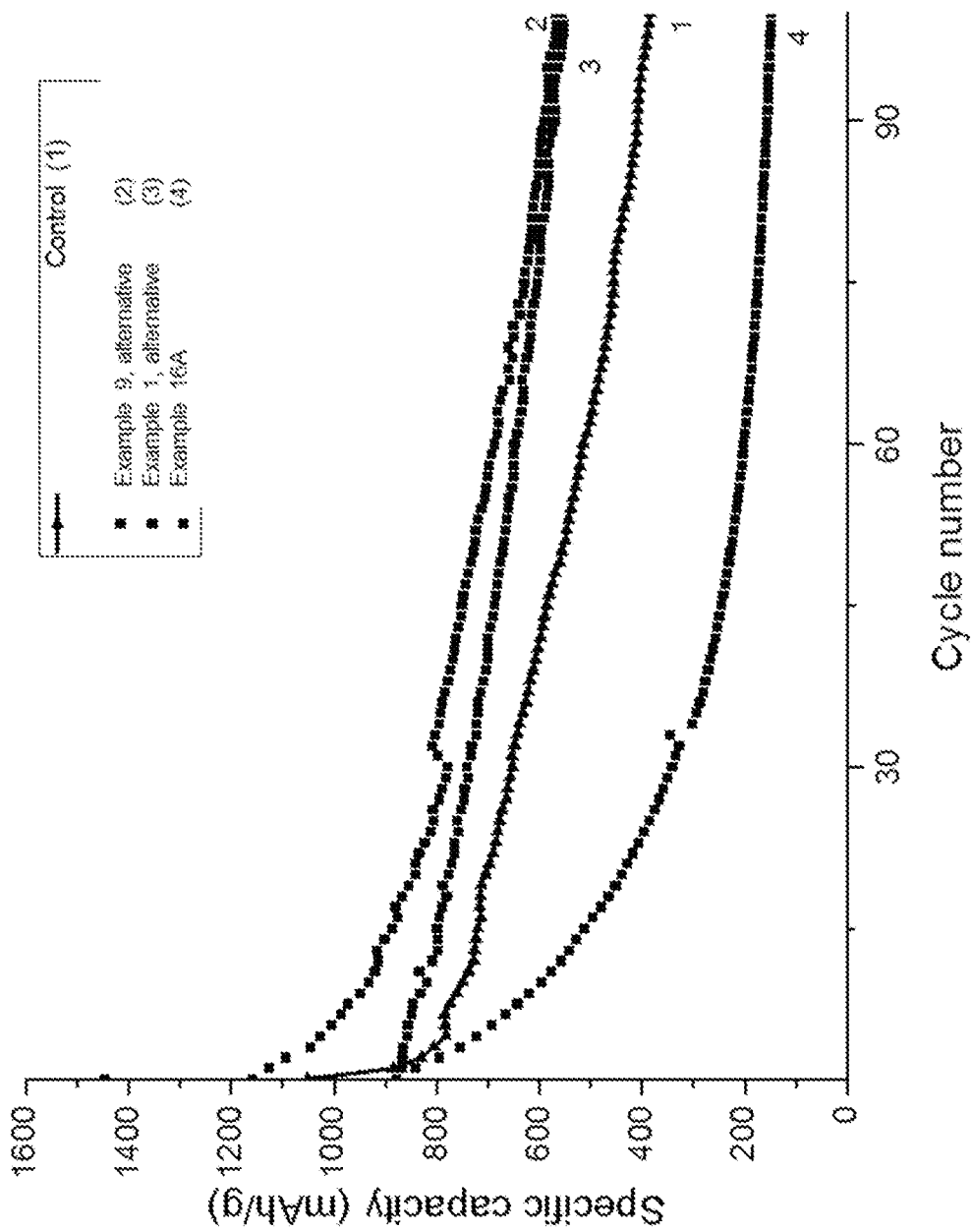

Cell cycling data is shown in FIG. 11 as data points (3).

Example 2

5 g of porous silicon with a surface area of approximately 100 m² g$^{-1}$ in accordance with Comparative Example 1 was washed with 1% wt HF solution for 10 min, and collected by filtration, and washed with water. The silicon was then placed in 10 mL 3-buten-1-ol, purged with Ar, and heated under an Ar atmosphere for 10 hr. The material was collected by filtration and washed with tetrahydrofuran (THF). The silicon was resuspended in 20 mL THF and cooled to 0° C. before addition of 2 g 2-[2-(2-chloroethoxy)ethoxy]ethanol followed by 0.4 g sodium hydride was added. The reaction was stirred under Ar and allowed to warm to room temperature for 3 hrs, and the product collected by filtration and washed with water. Lastly, the silicon was resuspended in 20 mL dimethylformamide, and 5 g 5-hydroxyisophthalic acid along with 100 μg paratoluene sulfonic acid and heated to reflux overnight. The product was collected by filtration and washed with dimethylformamide and water.

The resulting product has a linear ether heteroatom-functionalised oligomer with a Si—C bond between the electrochemically active material surface and the first end group, and a bulky second end group that may provide steric hindrance to limit access to the anode by the electrolyte:

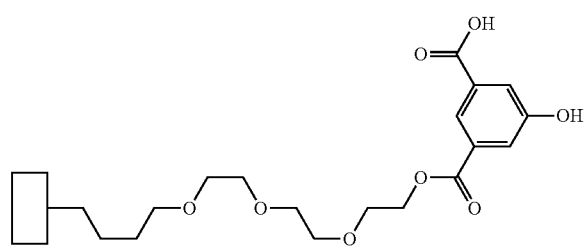 [SMILES: O=C(O)c1cc(O)cc(C(=O)OCCOCCOCCOCCCCC2CCCCC2)c1]

Example 3

An electrode comprising graphite particles as an electrically active material and polyvinylidenefluoride as a binder material is placed into a bath of 10% wt triethylene glycol in water with 1% wt sodium hydroxide. The electrode is soaked for 10 min before removal and drying on a hotplate and in a vacuum oven at 110° C. for 6 hr. The electrode is washed again with ice water to remove sodium hydroxide residue before drying again in a vacuum oven at 110° C. overnight.

The resulting product has a linear polyether functionalization on the graphite particle only on areas exposed to electrolyte.

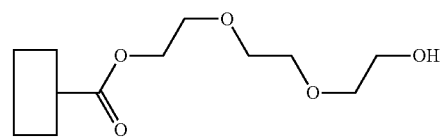

Example 4

50 g of silicon particles in accordance with Comparative Example 1 were placed in 300 mL water, and 16 mL HF dissolved in 100 mL water is added. The reaction was mechanically stirred for 10 min. 300 mL water was added and the Si retrieved by filtration. The Si was washed with 100 mL water and dried overnight in a vacuum oven at 60° C.

Option 1—Heat Treated Step (Example 4a)

6 g HF washed silicon in accordance with Example 4 was suspended in 40 mL toluene and 1.4 mL 3-[2-(2-Methoxyethoxy)ethoxy]-1-propene (sold as ENEA0180, from Gelest) was added. The reaction was stirred and heated to reflux under Ar overnight at 120° C. The reaction was cooled and filtered. The Si was washed with 50 mL acetone, before drying overnight in an oven at 70° C.

Option 2—Catalysed Treated Step (Example 4b)

6 g HF washed silicon is accordance with Example 4 was placed in 40 mL toluene and stirred in a RBF fitted with condenser and pressure equalised dropping funnel. 1.4 mL ENEA0180 (Gelest) was dissolved in 10 mL toluene and poured into the dropping funnel. 50 μL of the Karstedt stock solution (100 μL 10% Karstedt catalyst in toluene dissolved in 900 μL xylenes) was added, and the mixture heated to 60° C. under Ar with stirring. Once at 60° C., the ENEA0180 solution was drip fed into the reaction at a rate of 1 drop per second. The reaction was stirred overnight at 60° C. under Ar. The reaction was allowed to cool to room temperature, filtered, washed with 50 mL acetone and dried in a vacuum oven at 100° C. for 2 hr.

Alternative Method (Example 4c)

Hydride terminated RM363 (6.8 g) was carefully placed in an oven dried 100 mL 2 neck rbf with a stirrer bar. A clean dry air condenser was attached with an oil bubbler and the apparatus placed under argon. The apparatus was placed in a metal heating block on top of hotplate. Anhydrous toluene (40 mL, Sigma, lot: STBF8534V) was added via a syringe under argon. ENEA0180 (5 mL, Gelest Inc, lot: 5F-25141) was added via syringe. AIBN (150 mg, Sigma, lot: STBD7210V) was added. Finally, trimethylchlorosilane (0.5 mL) was added via a syringe. The brown slurry was stirred gently at room temperature, and the slurry degassed using a syringe needle with argon for a minimum of 1 h.

The needle was removed from the suspension and the mixture was heated to 60-65° C. overnight (ca. 18 h). The flask was lifted out of the metal block and allowed to cool to room temperature. The slurry was filtered under Buchner vacuum filtration, washed with acetone (50 mL), thf (50 mL), water (50 mL) and acetone (20 mL) and then dried overnight at 100° C. in the vacuum oven. Yield=6.4 g.

The BET surface area was 8 m$^2$/g. The particle size distribution was (μm) $D_{10}$=0.8; $D_{50}$=2.5; $D_{90}$=12.2.

The resulting structure for Examples 4a, 4b and 4c is shown below.

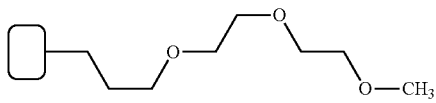

Example 5

6 g silicon particles were washed with 1% HF solution for 10 minutes, collected by filtration and washed with water. The silicon was washed with tetrahydrofuran (THF). The silicon was re-suspended in 40 ml of THF, Ar purged for minutes and cooled to 0 C before addition under Ar of 1.8 g chloroethxoyethanol followed by 0.35 g of NaH (in paraffin) is added under Ar. 0.498 mL methyl iodide was added. The reaction was stirred for 2 hr allowing the ice to melt and the reaction to warm. The reaction was stirred overnight under an Ar flow. The reaction was quenched with 5 mL isopropanol (IPA) before adding 10 mL H2O. Product collected by filtration and washed with 2×100 mL water and dried overnight at 70° C. The resulting structure is shown below. CH$_3$

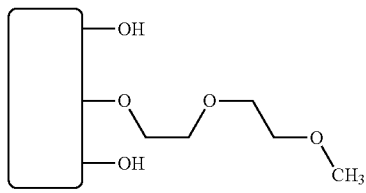

The BET surface area was 12 m$^2$/g. The particle size distribution was (μm) $D_{10}$=2.6; $D_{50}$=11.4; $D_{90}$=33.

Figure 8:
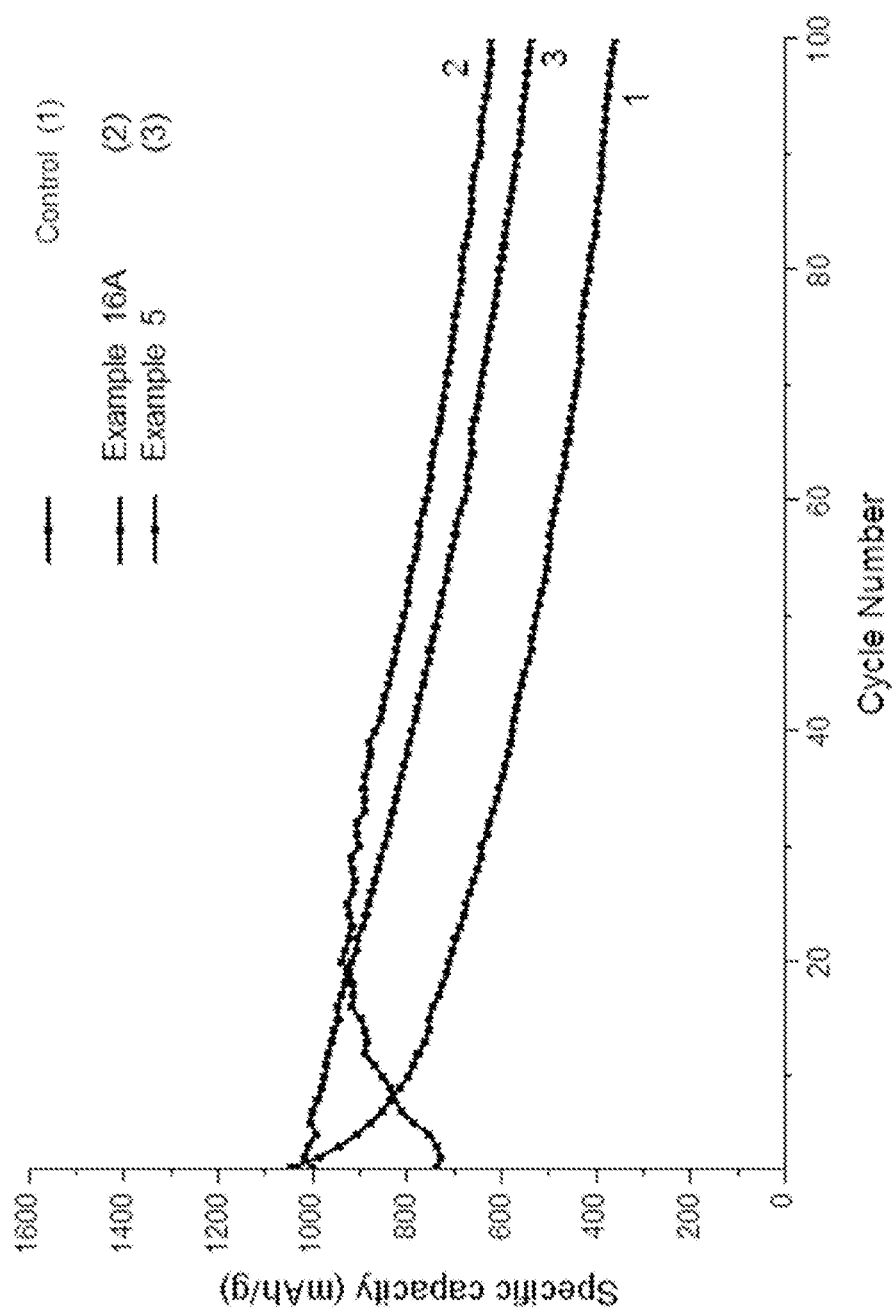
FIGS. 8-12 show comparative cell cycle data.

Cell cycling data is shown in FIG. 8 as data points (3).

Process to Form Electrode and Coin Cell Comprising the Porous Particles

Test coin cells were made with negative electrodes comprising the porous silicon particles of Comparative Example 1 and Examples 4a, 4b and 5 as follows. A dispersion of conductive carbons (a mixture of carbon black, carbon fibres and carbon nanotubes) in CMC binder was mixed in a Thinky™ mixer. Porous silicon particles were added to the mixture and mixed for 30 min in the Thinky™ mixer. SBR binder was then added to give a CMC:SBR ratio of 1:1 yielding a slurry with a weight ratio of porous particles:CMC/SBR:conductive carbon of 70:16:14. The slurry was further mixed by magnetic stirring for one hour, then was coated onto a 10 μm thick copper substrate (current collector) and dried to form a negative electrode comprising an active composite layer on the copper substrate. Full coin cells were made using circular negative electrodes of 0.8 cm radius cut from this electrode with a porous polyethylene separator and a lithium cobalt oxide positive electrode. The positive and negative electrodes were designed to form a balanced pair, such that the projected capacity ratio of the electrodes was around 1:1. An electrolyte comprising 1 M LiPF$_6$ in a 7:3 solution of EMC/FEC (ethylene methyl carbonate/fluoroethylene carbonate) containing 3 wt % vinylene carbonate was then added to the cell before sealing.

The coin cells were cycled as follows: A constant current was applied at a rate of C/25, to lithiate the anode, with a cut off voltage of 4.2 V. When the cut off was reached, a constant voltage of 4.2 V is applied until a cut off current of C/100 is reached. The cell was then rested for 1 hour in the lithiated state. The anode is then delithiated at a constant current of C/25 with a cut off voltage of 3.0 V. The cell was then rested for 1 hour. After this initial cycle, a constant current of C/2 was applied to lithiate the anode with a 4.2 V cut off voltage, followed by a 4.2 V constant voltage with a cut off current of C/40. The anode was then delithiated at a constant current of C/2 with a 3.0 V cut off. The cell was then rested for 5 minutes. This was then repeated for the desired number of cycles.

Example 6

The specific discharge capacity (mAh per gram of porous silicon particles) and discharge capacity retention (as a % of the initial discharge capacity) as a function of the charge/discharge cycle were measured of full coin cells made in accordance with the processes used to form electrode and coin cell comprising the porous particles as set out above. Coin cells using porous silicon particles of Comparative Example 1, Example 4a, Example 4b and Example 5 were compared. The results are shown in FIG. 6 and FIG. 7.

Figure 6:
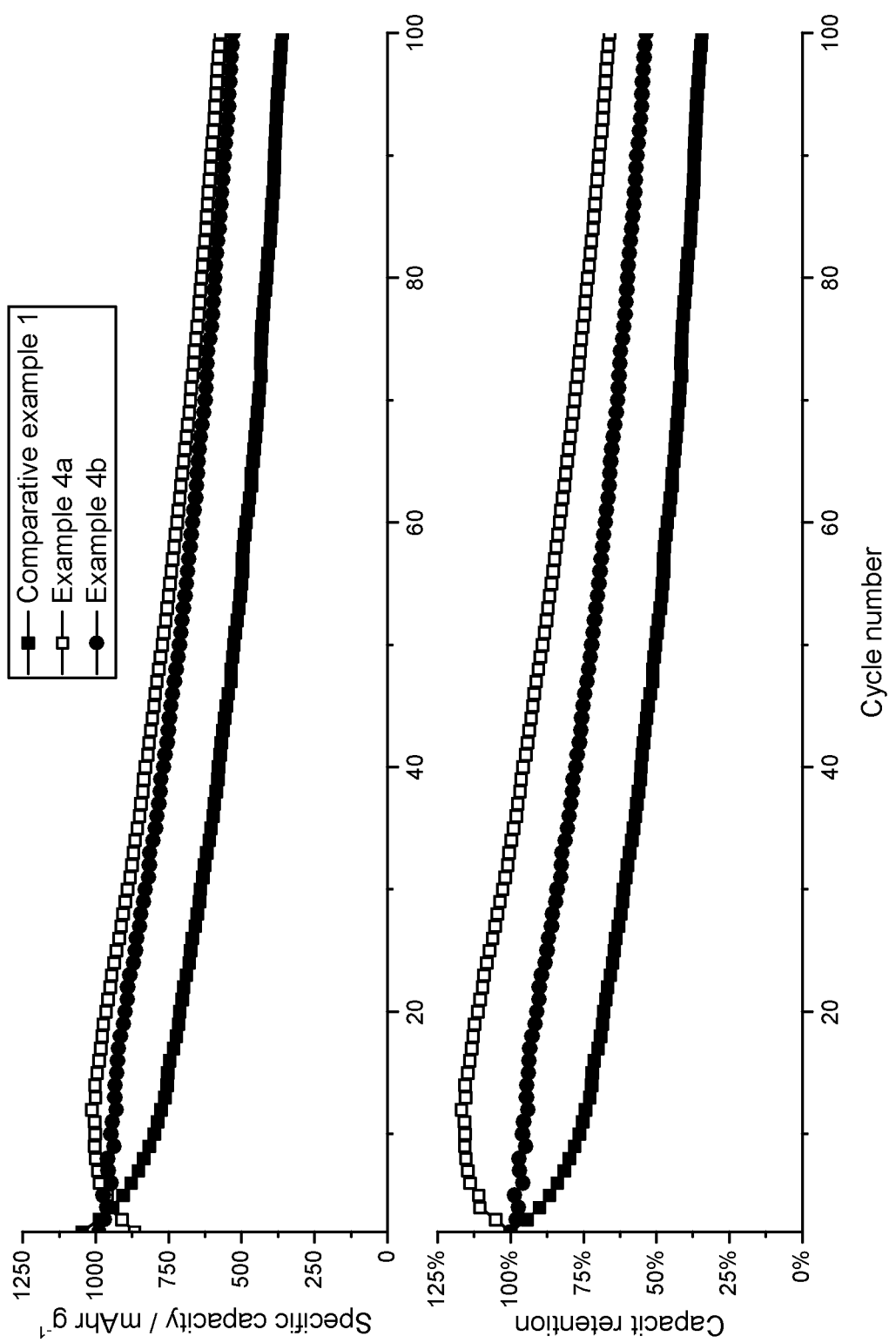
FIG. 6 shows comparative cell cycle data.

FIG. 6 shows that the cell with the modified porous silicon particles in accordance with Example 4a and Example 4b have a higher specific capacity and a higher capacity retention than the cell with porous silicon particles in accordance with Comparative Example 1. This means that the electrochemically active material in accordance with the present invention results in an improved cell. Example 4a which used the heat treatment method to modify the silicon particles had a higher specific capacity and a higher capacity retention than the cell of Example 4b which used a catalysed method to modify the silicon particles.

Figure 7:
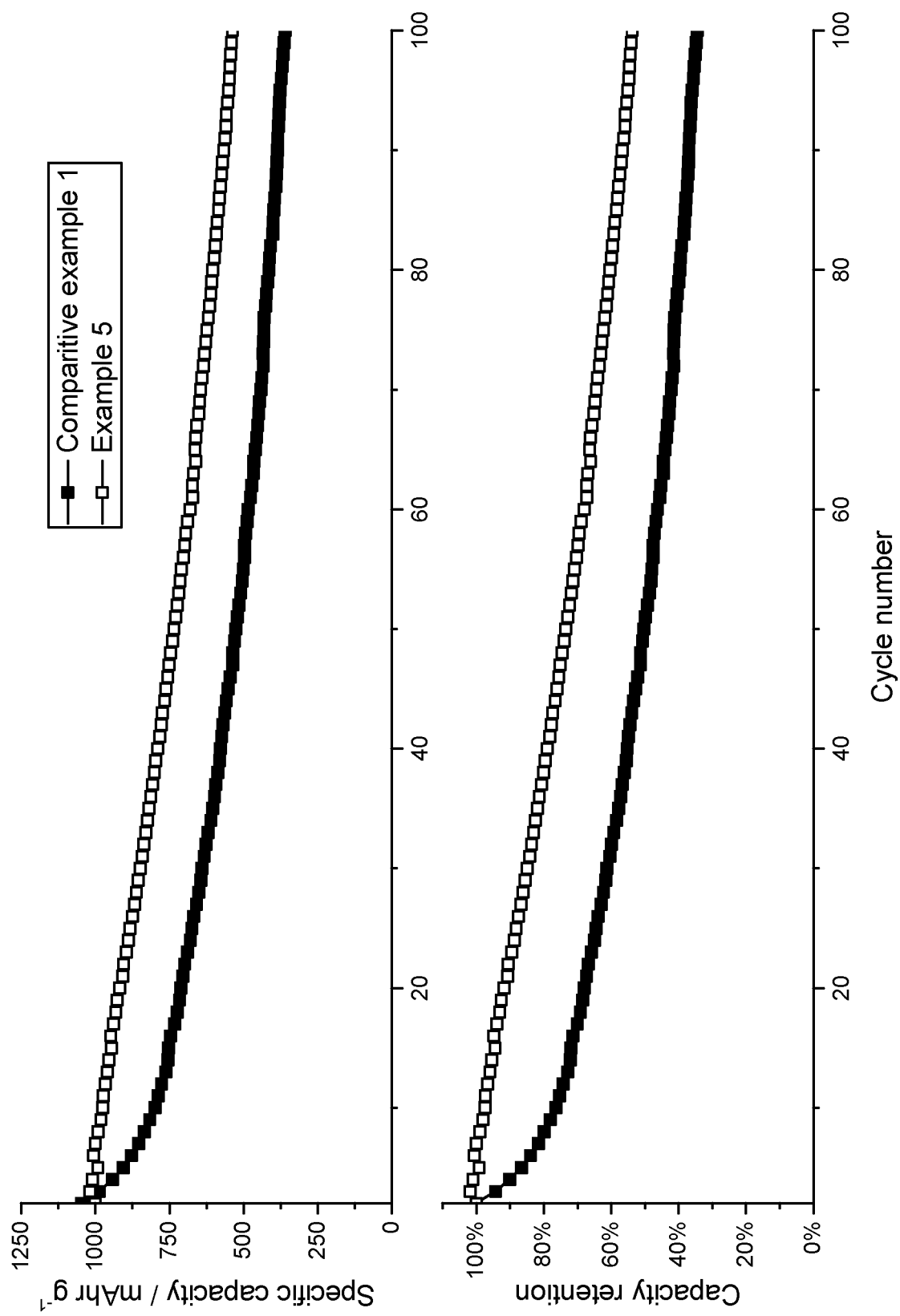
FIG. 7 shows comparative cell cycle data.

FIG. 7 shows that the cell with the modified porous silicon particles in accordance with Example 5 have a higher specific capacity and a higher capacity retention than the cell with porous silicon particles in accordance with Comparative Example 1. This means that the electrochemically active material in accordance with the present invention results in an improved cell.

Example 7

Porous silicon particles of were obtained by leaching 12 wt % Si—Al alloy particles. The porous silicon particles had a $D_{50}$ particle diameter of 20.6 μm and a porosity of 82%. 6 g of these silicon particles were suspended in 40 mL tetrahydrofuran (THF) and Ar purged for 10 min, whilst also cooling to 0° C. 0.32 g NaH (60% solids in paraffin) was added, and the mixture stirred for a further 10 min. 0.6 mL chloroethoxyethanol was added, and the reaction allowed to stir under Ar for 18 hr, slowly warming to room temperature as the ice bath melted. The reaction was then quenched with first 5 mL isopropanol (IPA) then 5 mL water, and the reaction was stirred for a further 10 min. The solids were collected by filtration, and washed with first 50 mL water then 50 mL acetone. The product is dried in an oven overnight before use. The reaction scheme is shown below.

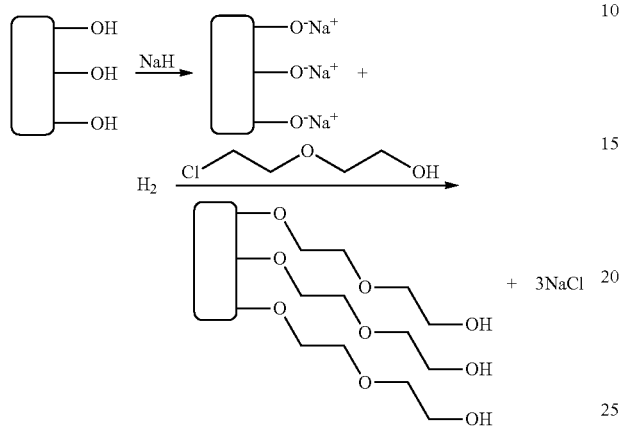

Example 8

6 g of silicon particles as described in Example 7 were suspended in 40 mL tetrahydrofuran (THF) and Ar purged for 10 min, whilst also cooling to 0° C. 0.32 g NaH (60% solids in paraffin) was added, and the mixture stirred for a further 10 min. 0.5 g [2,3,3,3-Tetrafluoro-2-(trifluoromethyl)propyl]oxirane was added, and the reaction allowed to stir under Ar for 1 hr, slowly warming to room temperature as the ice bath melted. The reaction was then quenched with first 5 mL isopropanol (IPA) then 5 mL water, and the reaction stirred for a further 10 min. The solids were collected by filtration, and washed with first 50 mL water then 50 mL acetone. The product was dried in an oven overnight before use. The reaction scheme is shown below, in which R is H or $CH_3$.

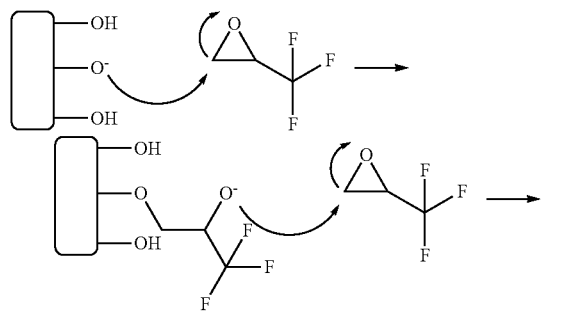

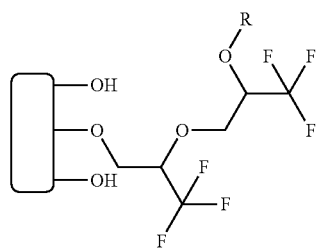

First Alternative Method for Example 8

6 g silicon particles in accordance with Comparative Example 1 were suspended in 40 mL tetrahydrofuran (THF) and Ar purged for 5 min. 0.69 mL of 1,1,1-trifluoro-2,3-epoxypropane was added and the mixture heated to 80° C. for 2 hr under Ar. The reaction was cooled, and the product was collected by filtration. The product was washed with 50 mL water and 50 mL acetone, before drying overnight in an oven at 70° C. The resulting structure is shown below, in which R is either H or $CH_3$.

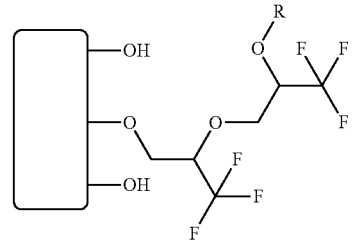

The BET surface area was 71 m²/g. The particle size distribution was (μm) $D_{10}=2.28$; $D_{50}=17.3$; $D_{90}=35.8$.

Figure 10:
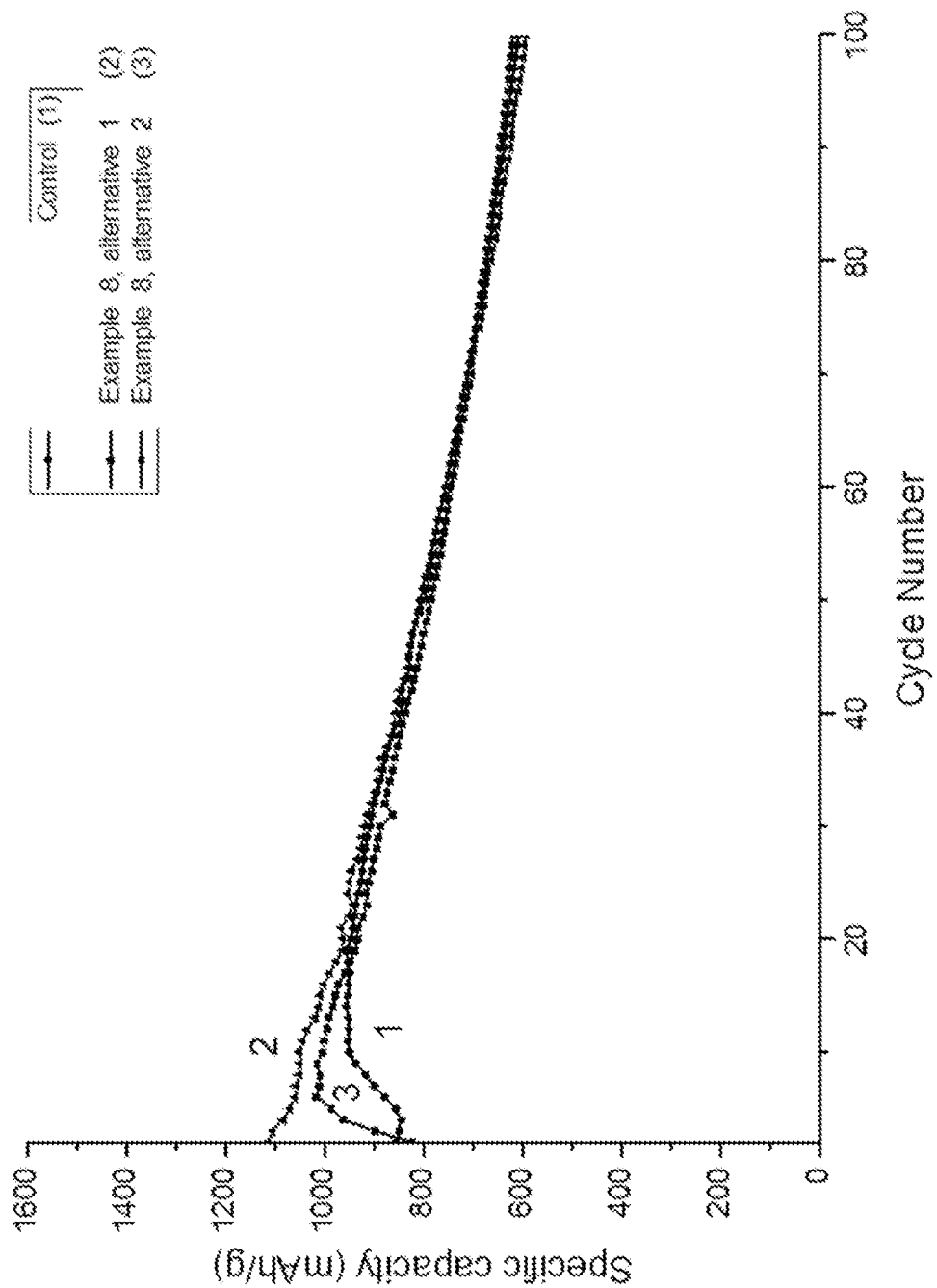

Cell cycling data is shown in FIG. 10 as data points (2).

Second Alternative Method for Example 8

6 g silicon particles in accordance with Comparative Example 1 were suspended in 40 mL tetrahydrofuran (THF) and Ar purged for 5 min. 0.69 mL of 1,1,1-trifluoro-2,3-epoxypropane was added and the mixture heated to 80° C. for 15 hr under Ar. The reaction was cooled, and the product was collected by filtration. The product was washed with 50 mL water and 50 mL acetone, before drying overnight in an oven at 70° C. The resulting structure is shown below, in which R is either H or $CH_3$.

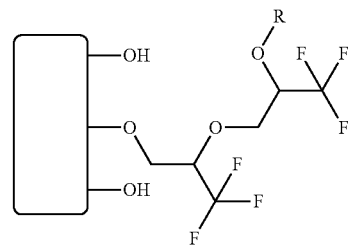

The BET surface area was 69 m²/g. The particle size distribution was $D_{10}=4.98$; $D_{50}=19.7$; $D_{90}=37.8$.

Cell cycling data is shown in FIG. 10 as data points (3).

Example 9

6 g of silicon particles as described in Example 7 were suspended in 40 mL tetrahydrofuran (THF) and Ar purged for 10 min, whilst also cooling to 0° C. 0.32 g NaH (60% solids in paraffin) was added, and the mixture stirred for a further 10 min. 1 mL glycidol was added, and the reaction allowed to stir under Ar for 1 hr, slowly warming to room temperature as the ice bath melted. The reaction was then quenched with first 5 mL isopropanol (IPA) then 5 mL water, and the reaction stirred for a further 10 min. The solids were collected by filtration, and washed with first 50 mL water then 50 mL acetone. The product was dried in an oven overnight before use. The reaction scheme is shown below.

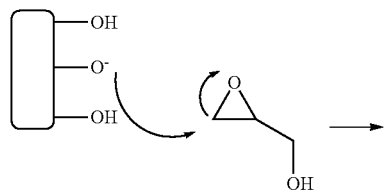

Alternative Method for Example 9

6 g Si particles were suspended in 40 mL THF and Ar purged for 5 min. The suspension is ice-cooled. To this 0.35 g of NaH (in paraffin) is added under Ar. 1 mL glycidol is dissolved in 20 mL THF and added dropwise into the reaction. The reaction is stirred for 2 hr allowing the ice to melt and the reaction to warm. The reaction is quenched with 5 mL IPA before adding 10 mL H$_2$O. Product collected by filtration and washed with 2×100 mL water and dried overnight at 70° C.

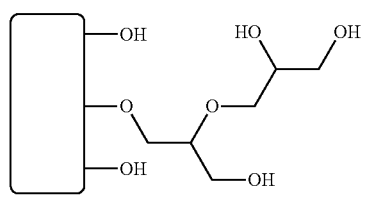

The BET surface area was 42 m$^2$/g. The particle size distribution was $D_{10}$=3.7; $D_{50}$=17.6; $D_{90}$=36.2.

Cell cycling data is shown in FIG. 11 as data points (2).

Example 10

6 g of silicon particles as described in Example 7 were suspended in 40 mL tetrahydrofuran (THF) and 2.3 g desired silane precursor agent. The mixture was purged with Ar for 10 min before the addition of 1 mL trimethylamine. The reaction was stirred for 6 hr before quenching with the addition of 5 mL isopropanol (IPA) followed by 5 mL water. The product was collected by filtration and washed with 50 mL water and 50 mL acetone. The reaction scheme is shown below.

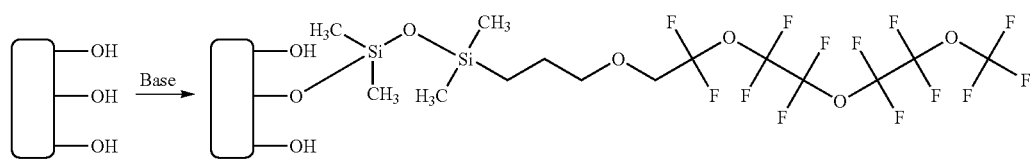

The BET surface area was 20 m$^2$/g. The particle size distribution was (μm) $d_{10}$=0.55; $d_{50}$=4.47; $d_{90}$=39.3.

Figure 12:
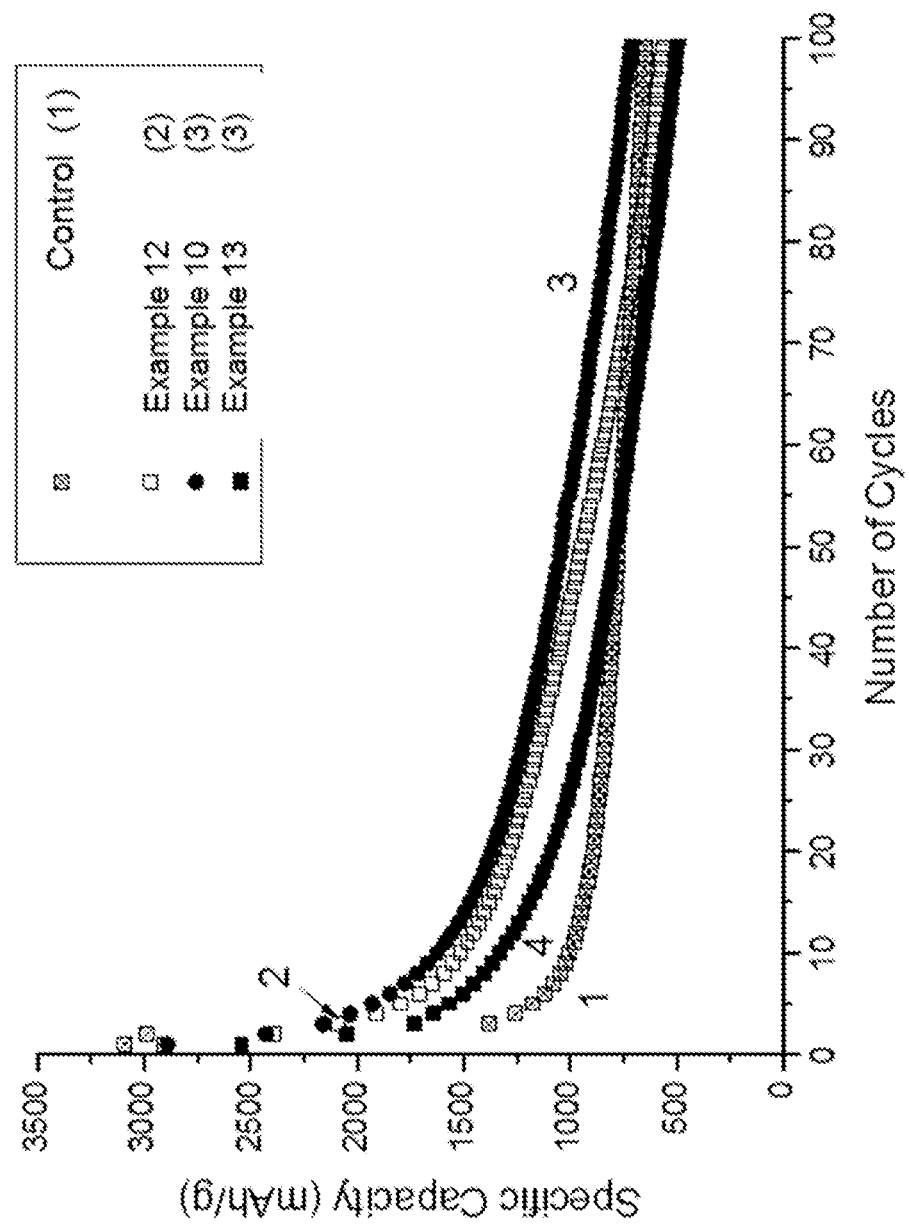

Cell cycling data is shown in FIG. 12 as data points (3).

Example 11

6 g silicon particles as described in Example 7 were suspended in 40 mL tetrahydrofuran (THF) and Ar purged for 5 min. 0.69 mL of 1,1,1-trifluoro-2,3-epoxypropane was added and the mixture heated to 80° C. for 2 hr under Ar. The reaction was cooled, and the product was collected by filtration. The product was washed with 50 mL water and 50 mL acetone, before drying overnight in an oven at 70° C. The resulting structure is shown below.

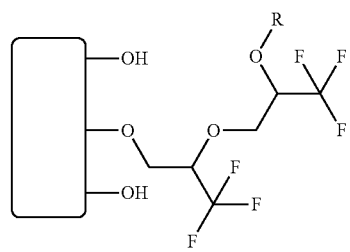

where R is either a repeating CH$_2$CH(CF$_3$)O unit or H.

Example 12

6.1 g silicon particles were placed in an RBF with a magnetic stirrer bar and suspended in 40 mL THF. The mixture is purged with Ar for 5 min. 1 mL triethylamine (dried over molecular sieves) is added. The reaction is heated with stirring to 100° C. Once at temperature 1 mL MR3681 (dried over molecular sieves) is added. The reaction is stirred at 100° C. overnight, then cooled and the solid collected by filtration. The solid is washed with 2×50 mL acetone and dried overnight at 100° C. in a vacuum oven. The resulting structure is shown below:

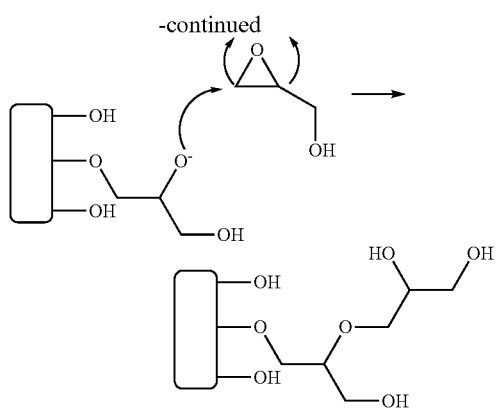
-continued

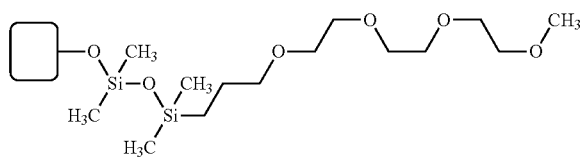

The BET surface area was 20 m²/g. The particle size distribution was (μm) $D_{10}$=0.522; $D_{50}$=4.030; $D_{90}$=35.5.

Cell cycling data is shown in FIG. 12 as data points (2).

Example 13

6 g silicon particles were suspended in 40 mL thf. 1 mL triethylamine (dried over molecular sieves) is added. The reaction is heated to 100° C. under Ar with stirring. Once at temperature, 1 mL pentamethyldisiloxane (PMDS) is added. The reaction is stirred at 100° C. under Ar overnight before cooling, filtration, and the solid washed with 2×50 mL acetone. The Si is dried overnight at 100° C. under vacuum. The resulting structure is shown below:

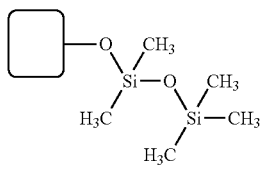

The BET surface area was 19 m²/g. The particle size distribution was (μm) $D_{10}$=0.416; $D_{50}$=2.91; $D_{90}$=29.3.

Cell cycling data is shown in FIG. 12 as data points (4).

Example 14

6 g silicon particles were suspended in 40 mL THF and cooled to ice temperature under an Ar flow. 0.34 g NaH is added and the reaction stirred for 10 min 0.6 mL chloroethoxyethanol is added and the reaction stirred overnight, slowly warming to room temperature. 0.78 mL trifluoroiodoethane is added and the reaction allowed to proceed for a further 24 hr. 5 mL IPA then 5 mL water is added to quench. The product is collected by filtration and washed with 50 mL water then 50 mL acetone. The collected product is dried overnight in an oven at 70° C. The resulting structure is shown below:

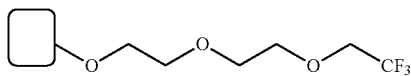

The BET surface area was 26 m²/g. The particle size distribution was (μm) $D_{10}$=1.16; $D_{50}$=10.4; $D_{90}$=54.5.

Figure 9:
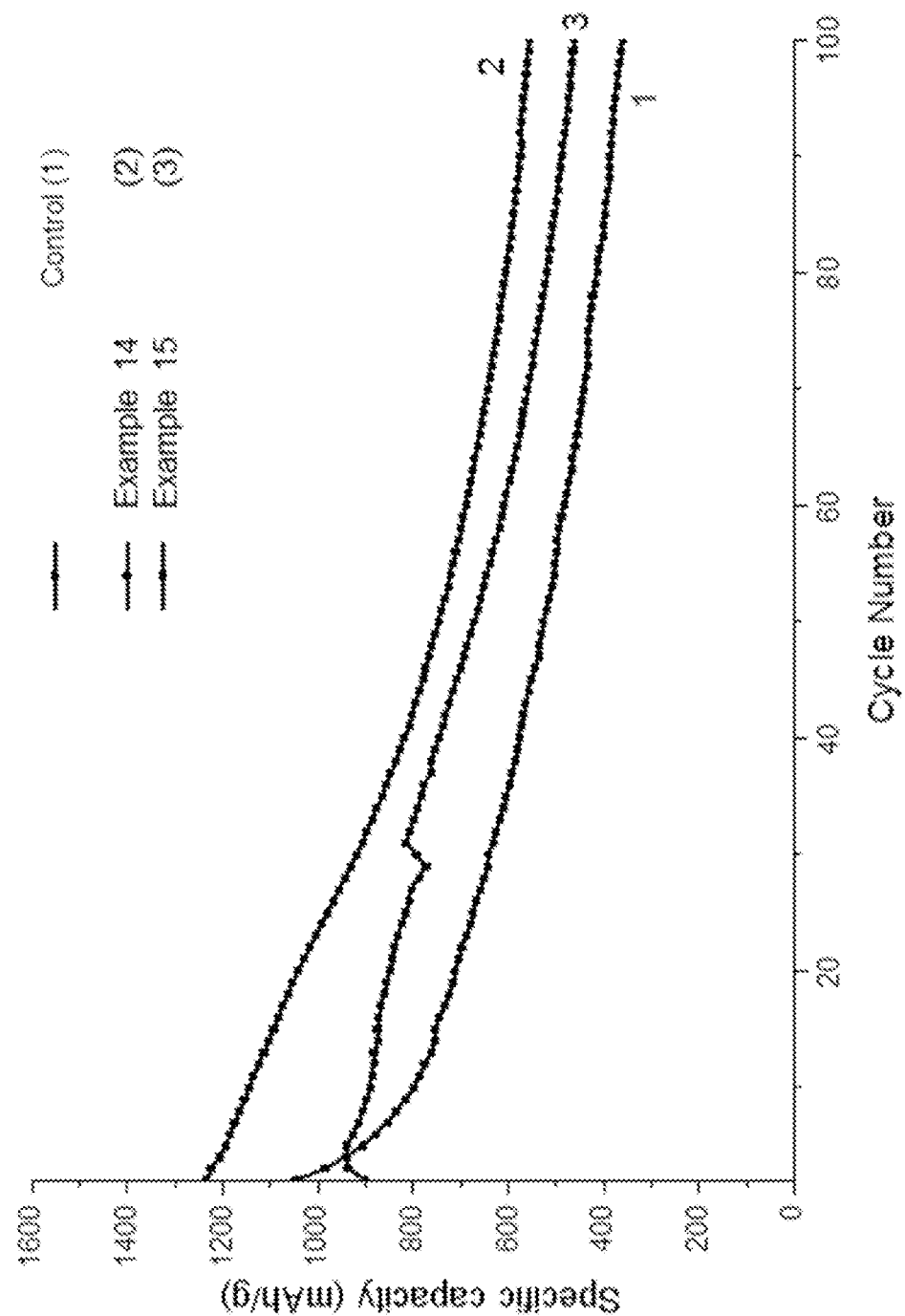

Cell cycling data is shown in FIG. 9 as data points (2).

Example 15

6 g silicon particles were suspended in 40 mL THF and cooled to ice temperature under an Ar flow. 0.78 mL trifluoroiodoethane is added and the reaction allowed to stir overnight slowly warming to room temperature. 5 mL IPA then 5 mL water is added to quench. The product is collected by filtration and washed with 50 mL water then 50 mL acetone. The collected product is dried overnight in an oven at 70° C. The resulting structure is shown below.

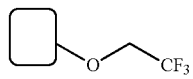

The BET surface area was from 36 to 42 m²/g. The particle size distribution was (μm) $D_{10}$=1.13; $D_{50}$=6.68; $D_{90}$=43.7.

Cell cycling data is shown in FIG. 9 as data points (3).

Example 16A 6 g of silicon particles in accordance with Comparative Example 1 were suspended in 40 mL tetrahydrofuran (THF) and Ar purged for 10 min, whilst also cooling to 0° C. 0.32 g NaH (60% solids in paraffin) was added, and the mixture stirred for a further 10 min. 0.6 mL chloroethoxyethanol was added, and the reaction allowed to stir under Ar for 18 hr, slowly warming to room temperature as the ice bath melted. The reaction was then quenched with first 5 mL isopropanol (IPA) then 5 mL water, and the reaction was stirred for a further 10 min. The solids were collected by filtration, and washed with first 50 mL water then 50 mL acetone. The product is dried in an oven overnight before use.

BET surface area was 27 m²/g. Particle size distribution was $d_{10}$=1.2 μm; $d_{50}$=11.2 μm; $d_{90}$=36.6 μm. The resulting product is shown below:

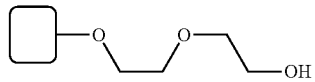

Cell cycling data is shown in FIG. 11 as data points (4) and in FIG. 8 as data points (2).

Example 16B 30 g Si particles were suspended in 200 mL THF and Ar purged for 5 min. The suspension is ice-cooled. To this 1.8 g of NaH (in paraffin) is added under Ar. 3.6 mL chloro-2, 2-ethoxyethanol is dissolved in 100 mL THF and added dropwise to the slurry of Si with vigorous stirring, under Ar in an ice bath.

The reaction is stirred for 2 hr allowing the ice to melt and the reaction to warm. The reaction is stirred overnight under an Ar flow. The reaction is quenched with 10 mL IPA before adding 50 mL H2O. Product collected by filtration and washed with 2×100 mL water and dried overnight at 70° C. The structure was the same as example 16B.

BET surface area was 37 m²/g. Particle size distribution was $d_{10}$=2.7; $d_{50}$=17.4; $d_{90}$=39.5.

Example 16C 6 g Si particles were suspended in 40 mL THF and Ar purged for 5 min. The suspension is ice-cooled. To this 0.35 g of NaH (in paraffin) is added under Ar. 0.6 mL chloro-2, 2-ethoxyethanol is dissolved in 20 mL THF and added dropwise to the slurry of Si with vigorous stirring, under Ar in an ice bath.

The reaction is stirred for 2 hr allowing the ice to melt and the reaction to warm. The reaction is quenched with 5 mL IPA before adding 10 mL H2O. Product collected by filtration and washed with 2×100 mL water and dried overnight at 70° C.

The BET surface area was from 26 to 48 m²/g. The BET surface area decreases with length of reaction. The structures obtained were:

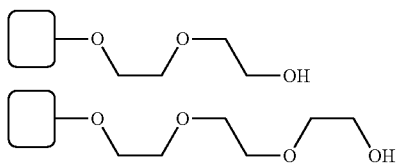

The invention claimed is:

1. A metal-ion battery comprising a negative electrode, the negative electrode comprising an electrochemically active material comprising a surface, wherein a linear or branched oligomeric moiety is covalently bonded to the surface, wherein the surface is bonded to the oligomeric moiety via group A, wherein A is silicon, carbon or germanium, and wherein said oligomeric moiety is selected from the group consisting of:

Formula I, Formula II, Formula III, and mixtures thereof:

  Formula I:

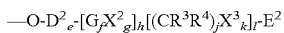  Formula II:

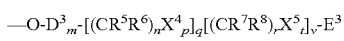  Formula III:

in which G is an aryl group selected from:

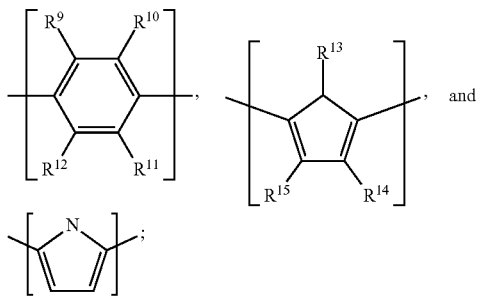

$R^1$, $R^2$, $R^3$, $R^4$, $R^7$ and $R^8$ are each independently selected from: H, F, fluorinated or non-fluorinated $C_{1-4}$ alkyl, fluorinated or non-fluorinated $C_{1-4}$ hydroxyalkyl, and phenyl;

$R^5$ and $R^6$ are each independently selected from Formula IV:

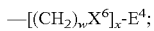  Formula IV:

$R^9$, $R^{10}$, $R^{11}$, $R^{12}$, $R^{13}$, $R^{14}$ and $R^{15}$ are each independently selected from H, F, and $CH_3$;

$X^1$, $X^2$, $X^3$, $X^4$, $X^5$ and $X^6$ are each independently selected from: O, PH, Se and NH;

$D^1$, $D^2$ and $D^3$ are each independently a first end group;

$E^1$, $E^2$, $E^3$ and $E^4$ are each independently a second end group;

a = 0 or 1;
b = from 2 to 6;
c = 0 or 1;
d = from 0 to 16;
e = 0 or 1;
f = from 2 to 6;
g = 0 or 1;
h = from 1 to 16;
j = from 2 to 6;
k = 0 or 1;
l = from 0 to 15;
h +l = from 2 to 16;
m = 0 or 1;
n = from 2 to 6;
p = 0 or 1;
q = from 1 to 16;
r = from 2 to 6;
t = 0 or 1;
v = 0 to 15;
q +v = from 2 to 16;
w = 2 to 6; and
x = from 1 to 15.

2. The metal-ion battery of claim 1, wherein said oligomeric moiety is a moiety of Formula I.

3. The metal-ion battery of claim 1, wherein said oligomeric moiety is a moiety of Formula II.

4. The metal-ion battery of claim 1, wherein said oligomeric moiety is a moiety of Formula III.

5. The metal-ion battery of claim 1, wherein the electrochemically active material is in the form of silicon particles or silicon-carbon composite particles.

6. The metal-ion battery of claim 1, wherein the electrochemically active material is in the form of one or more particles having a D50 of 10 nm to 40 nm.

7. The metal-ion battery of claim 1, wherein the electrochemically active material is in the form of a thin film, wherein the thickness of the film is 1 nm to 10 µm.

8. The metal-ion battery of claim 1, further comprising:
a positive electrode; and
an electrolyte between the negative electrode and the positive electrode.

9. The metal-ion battery of claim 1, wherein the electrochemically active material is in the form of
(i) a composite electrode layer comprising one or more particles comprising the electrochemically active material, wherein the composite electrode layer comprises at least one other component selected from a binder, a conductive additive and particles of a further electrochemically active material; or
(ii) a thin film comprising the electrochemically active material.

10. The metal-ion battery of claim 9, wherein the salt in the electrolyte is selected from a lithium salt, a sodium salt, a potassium salt, a magnesium salt, a calcium salt and mixtures thereof.

11. A method of making a metal-ion battery, comprising
(a) modifying at least part of an electrochemically active surface of an electrochemically active material, comprising grafting a heteroatom-functionalised oligomer to the at least part of the electrochemically active surface,
wherein the heteroatom-functionalised oligomer comprises a first end group, a second end group and a linker group therebetween,
wherein the first end group is grafted from the electrochemically active surface,
wherein the linker group has a carbon to heteroatom ratio of from 2:1 to 10:1, and wherein the heteroatoms comprise oxygen, nitrogen, sulphur, phosphorus, selenium or mixtures thereof, and
wherein the first end group is covalently bound to the at least part of the electrochemically active surface of the electrochemically active material by a reaction selected from the group consisting of: silyl ester formation, silyl ether formation, epoxide ring opening ether formation, carbonate ring opening reaction, imidazolidone ring opening reaction, silicon hydride modification, silicon hydride decomposition, $PCl_5$ surface modification, UV-initiated alkene or alkyne reaction, and combinations thereof;

(b) forming a negative electrode comprising the electrochemically active material and a current collector;

(c) assembling the metal-ion battery.

12. The method of claim 11 wherein the first end group is covalently bonded to the at least part of the electrochemically active surface of the electrochemically active material and the linker group is grafted from the first end group.

13. The method of claim 11, wherein the metal-ion battery comprises the negative electrode, a positive electrode and an electrolyte in between the negative electrode and the positive electrode.

14. The method of claim 11,
wherein the first end group is selected from a bond, an alkanediyl, an alkenediyl, an alkynediyl, a diyl of a secondary or a tertiary alcohol, an oxy-alkanediyl, a carbon/late group (OCO or COO), a carbonyl group, an alkenediyloxycarbonyl group, an alkenoyloxy group, an imino group, silyl group, a siloxane group, a hydroxyl modified phenylene, a carboxylic acid modified phenylene, an ether group (—O—), an amine group (—NR— where R is H or $C_{1-4}$ alkyl), and mixtures thereof,
wherein the linker group includes a repeating unit derived from linear or non-linear polyethers, linear or non-linear polycarbonates, polythiol ethers, polyamines, polyphosphines, polyesters, polyimines, polyureas, polythioureas, polyamides or mixtures thereof;
wherein the second end group comprises a functional group selected from the group consisting of hydroxyl, a carboxylic acid, amino, sulphonyl, alkanoyl, alkanoyloxy, $NH_2CONH$—, linear and branched alkyl groups of the formula —$(CH_2)_aCH_3$, wherein 0≤a≤9; linear and branched aryl and aralkyl groups of the formula —$(CH_2)_bC_6H_cF_d$, wherein 0≤b≤6, and the sum of c and d is 5; linear and branched fluorinated alkyl groups of the formula —$(CH_2)_e(CF_2)_fCF_3$, wherein 0≤e≤6 and 0≤f≤9; hydrogen; substituted or unsubstituted benzoyl; and combinations thereof,
with the proviso that when the linker group is derived from a polyamine the first end group is not a siloxane group.

15. The method of claim 11 wherein the linker group has a carbon to heteroatom ratio of from 2:1 to 5:1.

16. The method of claim 11, wherein the heteroatoms in the linker group are oxygen, phosphorus or selenium.

17. The method of claim 11, wherein the electrochemically active surface comprises silicon, carbon, germanium, or mixtures thereof.

18. The method of claim 11, wherein the linker group is a linear or non-linear polyether, or a polycarbonate.

19. The method of claim 11, wherein the linker group has a length of from 0.8 to 3.5 nm.

20. The method of claim 11, wherein the first end group comprises a group derived from at least one of an alkanediyl, an ether linkage, a carboxylate linkage, an ester linkage, a siloxane group and an amine linkage.

21. The method of claim 11, wherein the first end group has a length of from 0.1 to 0.6 nm.

22. The method of claim 11, wherein the second end group comprises an alcohol, a carboxylic acid, an amine, a sulphonate, a carbonate, a urea, linear or branched alkyl groups of the formula —$(CH_2)_aCH_3$, wherein 0≤a≤9; linear or branched aryl and aralkyl groups of the formula —$(CH_2)_bC_6H_cF_d$, wherein 0≤b≤6, and the sum of c and d is 5; linear or branched fluorinated alkyl groups of the formula —$(CH_2)_e(CF_2)_fCF_3$, wherein 0≤e≤6 and 0≤f≤9; hydrogen; and combinations thereof.

23. The method of claim 11, wherein the second end group has a length of from 0.1 to 1 nm.

24. The method of claim 11, wherein each heteroatom-functionalised oligomer has only one covalent bond to the surface.

25. The method of claim 11, wherein the electrochemically active material is in the form of silicon particles or silicon-carbon composite particles.

* * * * *